(12) United States Patent
Gould et al.

(10) Patent No.: US 8,656,209 B2
(45) Date of Patent: Feb. 18, 2014

(54) RECOVERY OF A FAILED REGISTRY

(75) Inventors: James Gould, Leesburg, VA (US); Tarik Essawi, Leesburg, VA (US); Kenneth Craddock, Jr., Leesburg, VA (US); Velmurugan Periasamy, Herndon, VA (US); Ramesh Balasubramanian, Ashburn, VA (US)

(73) Assignee: Verisign, Inc., Reston, VA (US)

( * ) Notice: Subject to any disclaimer, the term of this patent is extended or adjusted under 35 U.S.C. 154(b) by 334 days.

(21) Appl. No.: 13/118,039

(22) Filed: May 27, 2011

(65) Prior Publication Data

US 2012/0304004 A1  Nov. 29, 2012

(51) Int. Cl.
*G06F 11/00* (2006.01)

(52) U.S. Cl.
USPC .......................................................... 714/4.1

(58) Field of Classification Search
USPC .......................................................... 714/4.1
See application file for complete search history.

(56) References Cited

U.S. PATENT DOCUMENTS

| | | | |
|---|---|---|---|
| 7,076,541 B1 | 7/2006 | Burstein et al. | |
| 7,493,403 B2 | 2/2009 | Shull et al. | |
| 7,792,682 B2 | 9/2010 | Johnson | |
| 2002/0010682 A1 | 1/2002 | Johnson | |
| 2003/0177149 A1 | 9/2003 | Coombs | |
| 2004/0167982 A1 | 8/2004 | Cohen et al. | |
| 2004/0199608 A1 | 10/2004 | Rechterman et al. | |
| 2004/0199620 A1* | 10/2004 | Ruiz et al. | 709/223 |
| 2005/0102354 A1 | 5/2005 | Hollenbeck et al. | |
| 2006/0031385 A1* | 2/2006 | Westerdal | 709/217 |
| 2006/0085478 A1 | 4/2006 | Landau et al. | |
| 2006/0165060 A1* | 7/2006 | Dua | 370/352 |
| 2006/0218289 A1* | 9/2006 | Assad | 709/229 |
| 2007/0130284 A1 | 6/2007 | Stahura | |
| 2007/0271393 A1* | 11/2007 | Wong | 709/245 |
| 2008/0098084 A1 | 4/2008 | Volz et al. | |
| 2008/0260160 A1* | 10/2008 | Moreau | 380/277 |
| 2010/0161774 A1* | 6/2010 | Huang et al. | 709/221 |
| 2010/0186079 A1* | 7/2010 | Nice et al. | 726/14 |
| 2011/0060950 A1* | 3/2011 | Waldron et al. | 714/48 |
| 2012/0117095 A1* | 5/2012 | Chavvakula et al. | 707/758 |

OTHER PUBLICATIONS

Weimer, Florian, Passive DNS Replication, Apr. 2005.
Marcaria.COM, .TEL Domain Registry Announces Backup and Restore for .tel Domains, Oct. 30, 2009, http://blog.marcaria.com/domains/tel-domain-registry-announces-backup-and-restore-for-tel-domains/.
International Search Report and Written Opinion of PCT application No. PCT/US2010/048092, mailed Oct. 28, 2010, 8 pages total.
Extended European Search Report, issued from the European Patent Office, dated Sep. 17, 2012, in corresponding European Patent Application No. 12169174.5, 6 pages.

* cited by examiner

*Primary Examiner* — Bryce Bonzo
(74) *Attorney, Agent, or Firm* — MH2 Technology Law Group, LLP

(57) ABSTRACT

A system, method, and computer-readable medium, is described that enables a registry recovery service to retrieve zone files from a target registry, archive the zone files, publish the zone files to a managed DNS server, reconcile ownership of the zone files, and publish the zone files to a provisioning DNS server. The registry recovery service may also implement a WHOIS server for the zone and ownership information and may also implement zone specific features particular to the target registry's TLD. The registry recovery service may also enable DNSSEC extensions on the recovered registry DNS services.

27 Claims, 22 Drawing Sheets

RECOVERY OF A FAILED REGISTRY

TECHNICAL FIELD

This disclosure relates to the recovery of a failed registry.

BACKGROUND

The domain name system (DNS) and domain name registration system have become an integral part of how consumers and businesses conduct activity on the Internet.

One advantage of DNS is that it allows a person to visit a website by typing into a browser a "domain name", that is, a familiar word or group of words, rather than the numeric IP address of the computer on which the website resides. For example, a person desiring to visit the VeriSign website could do so by entering in their web browser the domain name "verisign.com" instead of an IP address, such as "10.10.1.100." Although, the user could enter either the domain name or the IP address, the moniker "verisign.com" is easier to remember than a string of digits. A domain name is an example of a "provisioned object," that is, an object that is assigned or released through a registry interface and supported by registration system standards.

The DNS system also allows multiple websites to share one IP address when multiple domain names all resolve to (that is, are associated with) the same IP address. A webserver that has been assigned a specific IP address receives, as part of the request for web content, the domain name requested and can then deliver the desired content to the requesting computer. This multiple-website feature is important because there are a finite number of IP addresses of the form 10.10.1.100, so called "IPv4 addresses." Without this ability for multiple websites to share an IP address, the possible IPv4 address space would likely have already been exhausted.

Furthermore, the next version of IP address space, so called "IPv6," includes an even more complicated numeric format. Whereas IPv4 is only 32 bits in binary length, IPv6 is 128 bits. A typical hexadecimal representation of an IPv6 address is 2001:0db8:85a3:0000:0000:8a2e:0370:7334. Because of the increased length of IP address in this format, there are approximately $5 \times 10^{28}$ theoretical addresses available for each one of the 6.8 billion people alive. Although IP address exhaustion will no longer be a concern under the new addressing scheme, the DNS system remains important so that people can use familiar domain names rather than long strings of hexadecimal digits to visit websites or access machines on the Internet.

The DNS system works by an interrelation of registrants, registrars, and registries. For example, registries maintain operative control over a top level domain (TLD), such as the traditional .COM, .NET, .ORG, .EDU, and .GOV, as well as the newer .BIZ, .INFO, and .NAME TLDs. Registrants are the entities that "reserve" the use of a domain name in a specific TLD for a finite time. Registrars act like an intermediary between the registrants and registry. Registrars receive and process the registrants' domain name reservation requests, and provide tools and an interface to the registrant to maintain operation of its reserved names. Registries in turn receive and process requests from registrars and provide tools and an interface to the registrar to maintain operation of its customers (registrants) reserved names. The registry makes available the mechanism to reserve and update domain name registrations through the Extensible Provisioning Protocol (EPP). Registrars that are authorized by the registry have the ability to make reservations and check the state of domain names through the EPP. The registry provides the EPP as a communications gateway to registrars for such purposes In addition to the traditional TLDs, new generic TLDs (gTLDs) may be applied for from the regulatory body pertaining to registries and registrars, the Internet Corporation for Assigned Names and Numbers (ICANN). The domain name registration system has also evolved to incorporate various country code TLDs (ccTLDs), each one reserved for use by a particular country, such as, .CA, .CN, .TV, and .US, associated with Canada, China, Tuvalu, and the United States, respectively. The domain name system and domain name registration system have also evolved to allow the use of alternative character sets to accommodate foreign languages.

In a typical domain name registration example, a registrant may want to reserve the domain name "example.com." The registrant would contact a registrar that has a business relationship with the registry that operates the .com TLD. The registrant would query the registrar as to the availability of the domain name "example" in the ".COM" namespace. The registrar in turn would query the proper registry through the EPP, and then return the results to the registrant. The registrant may then obtain a registration of the domain name by paying a registration fee and providing information required by the registry and registrar. The registry charges the registrar for the domain name registration and the registrar collects the registration fee from the registrant.

The registrar has a relationship with both the registrant and the registry, but the registry only has a direct relationship with the registrar. The registry can be a "thin registry," storing no information about the registrant, or a "thick registry," storing contact or other information about the registrant. Any information stored about the registrant is obtained through the registrar. Thus, from the registry's perspective, the owner of the domain is the registrar.

Domain names are examples of registry objects. Standardized registry objects are defined in RFCs. To safeguard the system of registry objects, the regulatory entity responsible for registry objects, ICANN, provides a set of rules for the situation where a registrar fails. ICANN has also attempted to require safety measures to be implemented by registries to account for the situation when a registry might fail. For example, registries are supposed to place its registration data into a data escrow.

A registry might fail for a number of reasons, including natural disasters or government interference, but most likely a registry would fail for insolvency. When a registry becomes insolvent, the entire namespace for that TLD becomes at risk for complete failure. This would mean that name resolution would no longer work for the entire TLD. If, for example, the .info registry failed, over 8 million domain addresses would no longer work.

One problem with having the registry system data escrow system as described is that it does not provide a true and adaptable recovery plan. It does not, for example, contemplate the recovery strategy when the escrow data is unavailable. If considered an asset, escrow data may be tied up in a bankruptcy filing. Even if escrow data were available, it is unclear who would be responsible for using the data to restore operation of the TLD. Escrow data is also just data. It does not include implementation of special non-standard TLD features. Finally, due to the nature of the public's economic and social reliance on the Internet, every second that a domain is unreachable could be quite costly for an organization. Therefore a method is needed to allow for the quick and efficient recovery of a TLD in the event a registry fails.

Another example where such a method would be desirable is when a new registry applies to ICANN to operate a new TLD, lobbies a country to operate its ccTLD, or applies to ICANN to take over operation of an existing TLD. Having an independent registry recovery service, would reduce the risk involved in selecting a registry that might otherwise be denied for consideration. Such a registry recovery service may even act as a hot-backup that can be switched to very quickly.

Another example where such a method would be desirable is when a registry is failing to meet the minimum service level agreements as outlined in its contract with ICANN for operation of a gTLD or the government of the country assigned to the ccTLD. The contract could provide for the registry recovery service to take steps to intervene if delinquency persists.

SUMMARY

A computer-implemented method of recovering a registry includes receiving zone files from a target registry and archiving them in a data repository. The method includes publishing the zone files to a managed DNS service to make available for DNS name resolution. The method further includes reconciling ownership of the zone files with particular registrars and merging ownership data with zone file data into a baseline provisioning DNS database. The method also includes publishing the zone files in a provisioning DNS database. The method includes prioritizing functions of the recovered registry including optional TLD specific registry functions. The method includes publishing the public provisioning database information in a WHOIS service. The method also accommodates DNSSEC extensions when the target registry implements them.

It is to be understood that both the foregoing general description and the following detailed description are exemplary and explanatory only and are not restrictive of the application, as claimed.

The accompanying drawings, which are incorporated in and constitute a part of this specification, illustrate one (several) embodiment(s) of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Figure 1:
FIG. 1 is an illustration of the interaction between the Domain Registrant, Domain Registrar, and Domain Registry.

FIG. 1 illustrates the data flow and relationship definition of the three primary parties involved in a domain registration. The registrant 110 is typically an end user of the domain, but in some cases, may resell the domain to either another registrant in a domain transfer transaction or may retain ownership of the domain but let a third party use it, as when the registrant is a web hosting provider and the third party is a customer of the registrant. Moreover, some registrants never intend to use a domain in a traditional fashion. Some registrants hope to reserve desirable domain names that they can sell for a profit and some registrants reserve names that are slight variations of popular websites, hoping to receive Internet traffic from people mistyping the URL of the popular website. Some registrants will find new ways to use the domain name system other than for the traditional use of hosting websites associated with the domain name that directs a user to a website.

Registrants 110 reserve domain names from registrars 120. Thus, the registrant's 110 relationship is primarily with the registrar 120. The registrar, however, maintains a relationship with one or more registries 130 that control the TLD for which registration is desired. Typically, large registrars have multiple relationships with many registries to assure they can provide registrants with many TLD domain options when reserving their domains. The abstraction between the registry 130 and registrant 110 is convenient to the registrant because the registrant 110 can register all or most of its domain names from one registrar 120, rather than having to have multiple relationships with multiple registries 130.

Registries 130 control the assignment of domain names. A registry is responsible for assuring that domain information is accurate and up to date. Further, the registry is responsible for providing first level DNS support for the TLD. For example, the registry that manages the .ORG TLD must provide (or otherwise make available) a DNS server containing nameserver information for a domain name registered through the registry so that when a website is requested via the domain name in a URL, the proper nameserver will eventually respond to the request, by providing a fully resolved domain name (that is, resolved to the IP address of the machine designated as responsible to respond for the domain name). Registrar 120 and registry 130 each comprise one or more computers to implement the functions described herein, and may correspond to functions and structures disclosed below.

Figure 2:
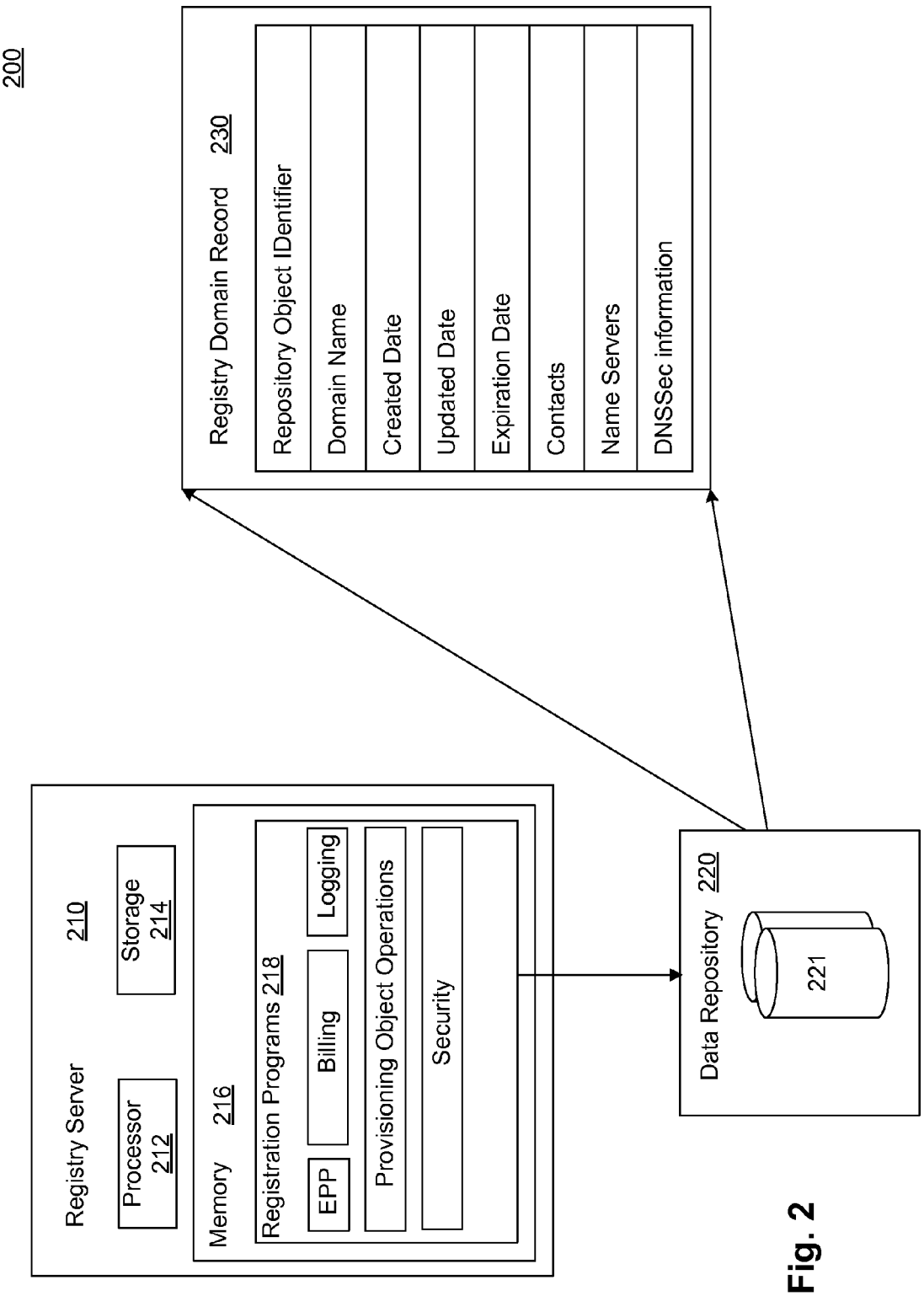
FIG. 2 is an illustration of a Domain Registry Server with supporting Registration Programs, including an exemplary registry domain record.

FIG. 2 shows an exemplary provisioning system. A registry server 210 has a processor 212, memory 216, and local storage 214. Registration programs 218 are executed on the server to provide specific functionalities of the provisioning system. The provisioning system has one or more data repositories 220 containing one or more storage devices 221 to store domain records 230 and administrative records 240. The provisioning system may be made of one, few, or many individual servers and each server may be optimized to run particular registration programs. The servers may also be configured to communicate with each other such that server resources are evenly distributed among many servers.

Figure 3:
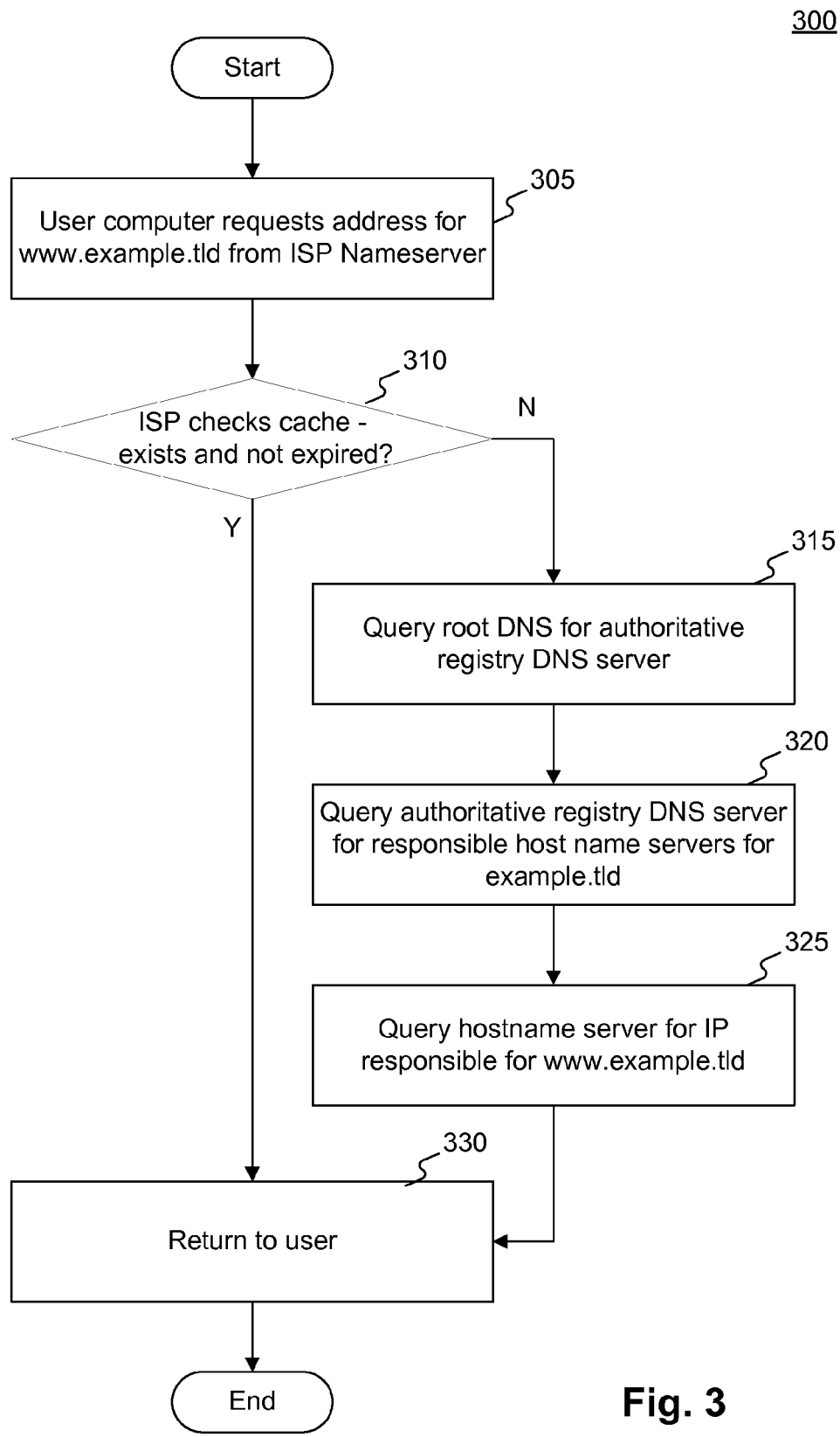
FIG. 3 is an illustration of a typical Domain Name lookup request.

FIG. 3 shows a typical process undertaken when a user enters a URL in a web browser for the first time. In step 305, the user's computer requests IP information for the entered URL, in this case, "www.example.tld," from the user's Internet Service Provider's (ISP) nameserver computers. The ISP checks its local cache to see if it has cached the IP address of the machine corresponding to the URL. If the entry exists and has not expired, then the ISP will return the IP address to the user's computer. Otherwise, in step 315, the ISP's nameserver will query the root DNS system to discover the authoritative DNS responder for the TLD. In step 320, the ISP's nameserver will query the authoritative DNS responder for the TLD for the specific domain, e.g., "example." The response will be a list of nameservers with authority to provide IP addresses for the "example.tld" domain. Finally, in step 325, the ISP's nameserver will query one of the domain's nameservers to discover the IP address for "www.example.tld." Then the ISP's nameserver returns the IP address corresponding to the entered URL. If any one of the DNS nameserver systems in this illustration fails, then resolution will fail and the user will not be able to receive the content requested via the URL.

This process is slightly modified when the TLD implements DNS Security (DNSSEC) extensions. In a TLD implementing DNSSEC, each of the registry zone files contains a public key to the next authoritative nameserver, and is digitally signed using a private key. The corresponding public key is given to the root nameserver, which digitally signs the DNS entry with its private key. Because the root nameserver is trusted, the public key of the root nameserver may be retrieved directly from a key store. A lookup request queries the trusted root zone for authoritative nameserver information for the TLD and for the public key. The public key is then used to verify the identity of the registry nameserver. This process keeps the chain of trust intact. Because a lookup request begins with a trusted node (the root server), each subsequent step in the chain of lookups maintains the trust by using the public/key private key infrastructure. Thus, once the identity of the registry is verified using the public key, the registry returns the public key information for the next authoritative nameserver, as in step 320 in FIG. 3. The next authoritative nameserver has also digitally signed the DNS entry with a private key. The chain continues indefinitely until the last node is reached and the ultimate IP address determined.

Figure 4:
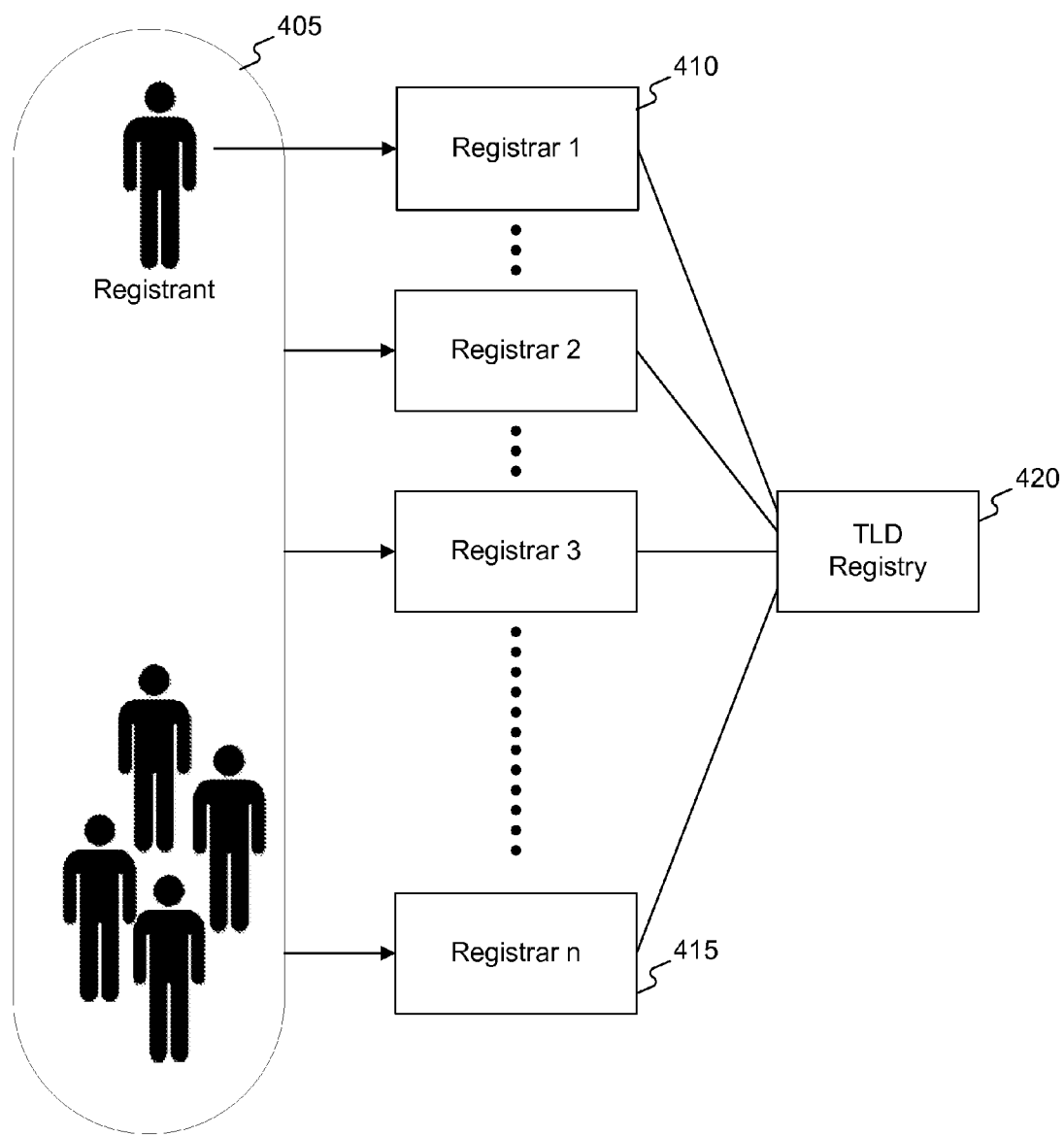
FIG. 4 is an illustration of the relationship of registrants, registrars, and a registry for a particular TLD.

FIG. 4 helps illustrate the significance of a registry. A very large pool of registrants and potential registrants 405 may register a domain name with many different registrars 410. Typically, once a registrant chooses a particular registrar, the registrant will continue to use this registrar for future registrations of different domains, but, if the registrant chooses, the registrant can transfer the domain to a different registrar. Indeed, ICANN data shows that in 2007, a registrant could choose from almost 500 different registrars for the .COM, .NET, .ORG, .INFO, .BIZ, and .US TLDs. With so many registrars available, the failure of a registrar is inevitable. Thus, ICANN has policies in place to transfer registrations from one registrar to another should a registrar fail. The TLD Registry 420, however, is a sole entity. There are millions if not billions of potential registrants, hundreds of registrars, and one registry for every TLD. Therefore, the role of the registry is important.

Turning back to FIG. 2, the systems 200 involved in supporting all of the registrants, registrars, and registration objects are complex for a registry to operate. A person of ordinary skill in the art will appreciate the complexity and cost of implementing such a system. The provisioning system of FIG. 17 also helps to illustrate this complexity.

Given that the registry's role is such an important and integral part of the Internet, ICANN has contemplated the need to implement an approach for restoring a registry's information should the registry fail. ICANN has encouraged registries to subscribe to a data Escrow service. The data Escrow service holds an independent copy of the registry's data, so that in the event the registry fails, an authorized entity can use the Escrow data to bring the TLD back up. ICANN has not, however, demonstrated a method of performing such a recovery, nor made accommodations to support the recovered registry. In addition, although the Escrow data exists, it is not clear whether the data will be accessible, or if it will be accessible, when access will be granted, and when access is granted, what procedures should be taken to bring the TLD back. Indeed, it may be that if the registry fails for insolvency and equipment is seized, access to the Escrowed data may be restricted by a court. ICANN has also not considered how to accomplish recovery of registries supporting special nonstandard features.

Figure 5:
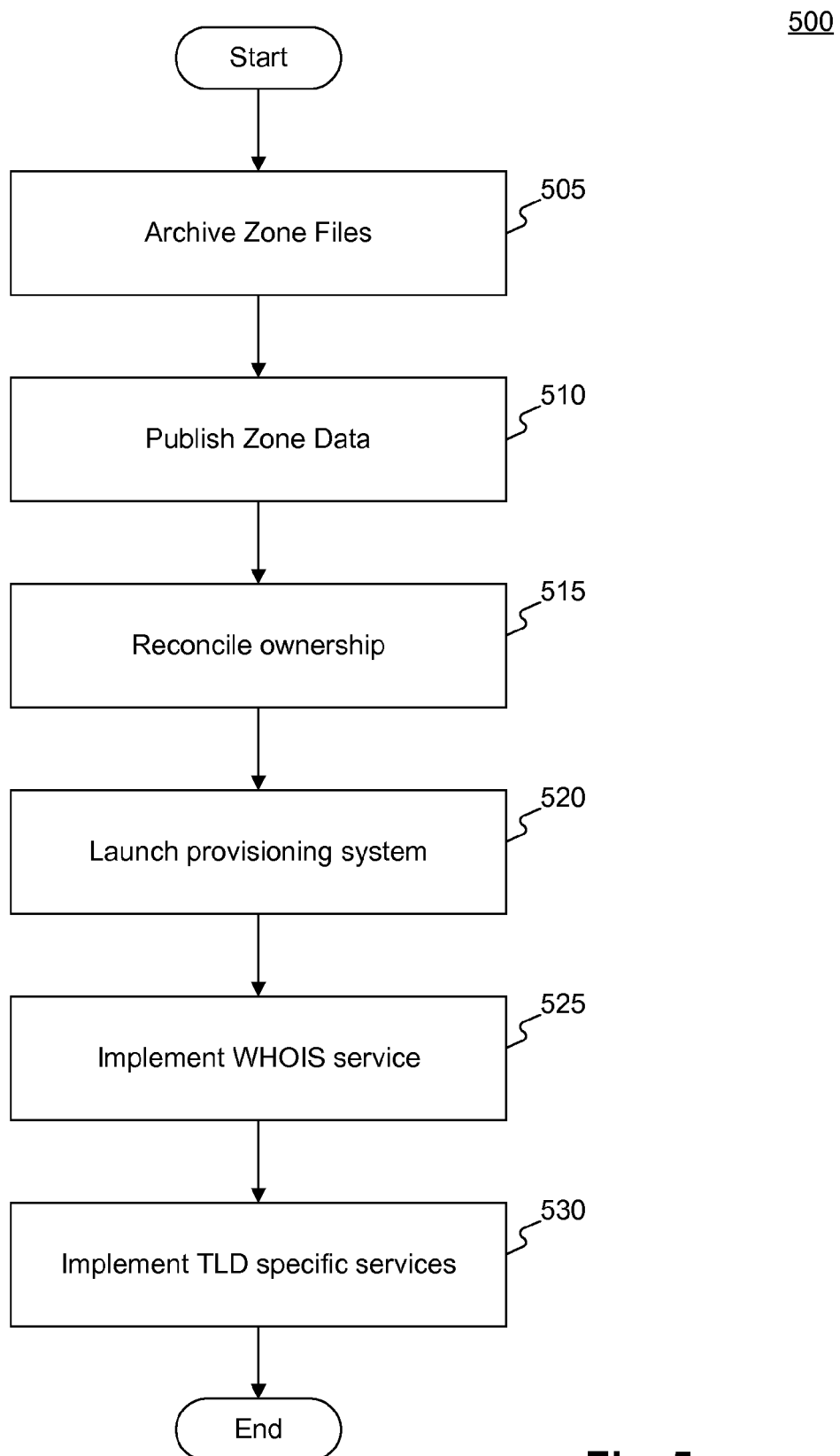
FIG. 5 is an illustration of an exemplary process to perform the recovery of a failed registry.

Embodiments consistent with this disclosure address these concerns and describe a registry recovery service and method of recovering a registry. FIG. 5 illustrates one embodiment of the registry recovery process 500. The exemplary process 500 may be used when the registry is uncooperative and when the registry does not implement DNSSEC extensions for the TLD. In step 505, zone data from a target registry is gathered and archived. Step 510 publishes the zone data into a managed DNS server. Step 515 reconciles the ownership data for each archived zone, associating a zone with the corresponding registrar. Step 520 identifies provisioning requirements and launches the provisioning system. Steps 525 and 530 are only required if the TLD provides WHOIS services or a TLD specific service.

In one embodiment, the exemplary process 500 may be altered when the target registry is cooperating with the backup efforts of the registry recovery service. Step 505 may be modified by archiving, along with the zone data, the ownership information received from the target registry. Steps 510 and 515 may be removed because a transitional managed DNS service is not needed, i.e., when triggered, the DNS service may launch directly from the provisioning system of step 520.

In one embodiment, the exemplary process 500 may be altered when the target registry implements DNSSEC for the TLD. Step 505 may be altered to archive signed zone files (or if DNSSEC is implemented on a domain-by-domain basis, step 505 may archive zone files or signed zone files according to whether the particular domain uses DNSSEC). Steps 510 and 520 may be altered to accommodate DNSSEC, as will be discussed below in conjunction with FIGS. 13 and 20, respectively.

Figure 6:
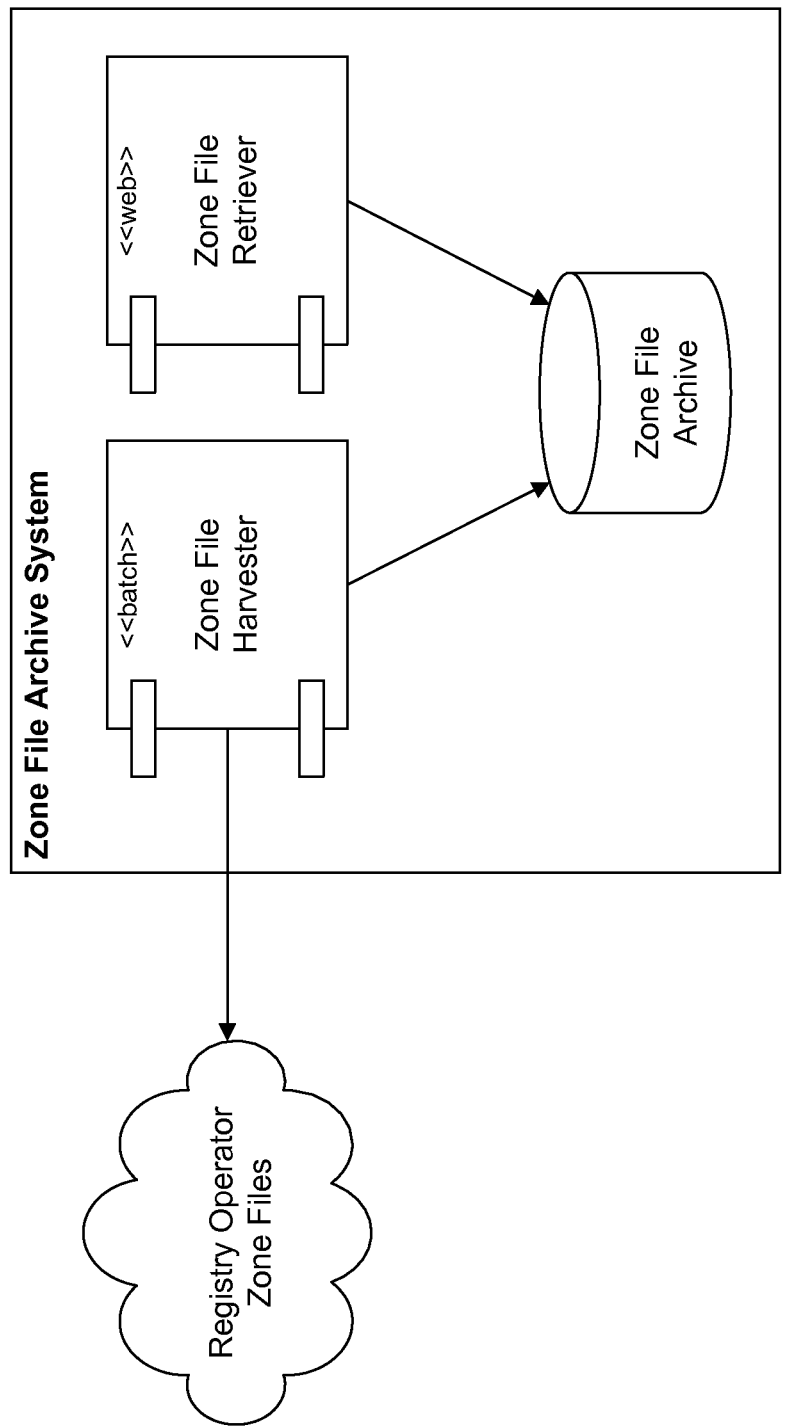
FIG. 6 is an illustration of the components of a Zone File Archive System for use in one of the steps in the process found in FIG. 5.

In one embodiment, the exemplary process 500 may be altered when the target registry is cooperating with the backup efforts of the registry recovery service and implements DNSSEC for one or more domain objects. Step 505 may be modified by archiving, in addition to the unsigned zone files, the signed zone and the ownership information received from the target registry. The registry recovery service may also be given a cloned Hardware Signing Module (HSM) with corresponding keys. Steps 510 and 515 may be removed because a transitional managed DNS service is not needed, i.e., when triggered, the DNS service may launch directly from the provisioning system of step 520. Step 520 may be altered to accommodate DNSSEC, as will be discussed in conjunction with FIG. 21, below. FIG. 6 provides an illustration of an exemplary Zone File Archive System. The system retrieves Registry Operator Zone Files and processes them with a Zone File Harvester. The Zone File Harvester archives the zone files. The system also implements a Zone File Retriever that may interface directly with a user to review and update zone files in the archive and zone files retrieved from the Registry Operator Zone Files. The Zone File Retriever provides an interface to the user through a standard web browser, but may also be accessed through a standalone software solution or directly at the Zone File Retriever device.

Figure 7:
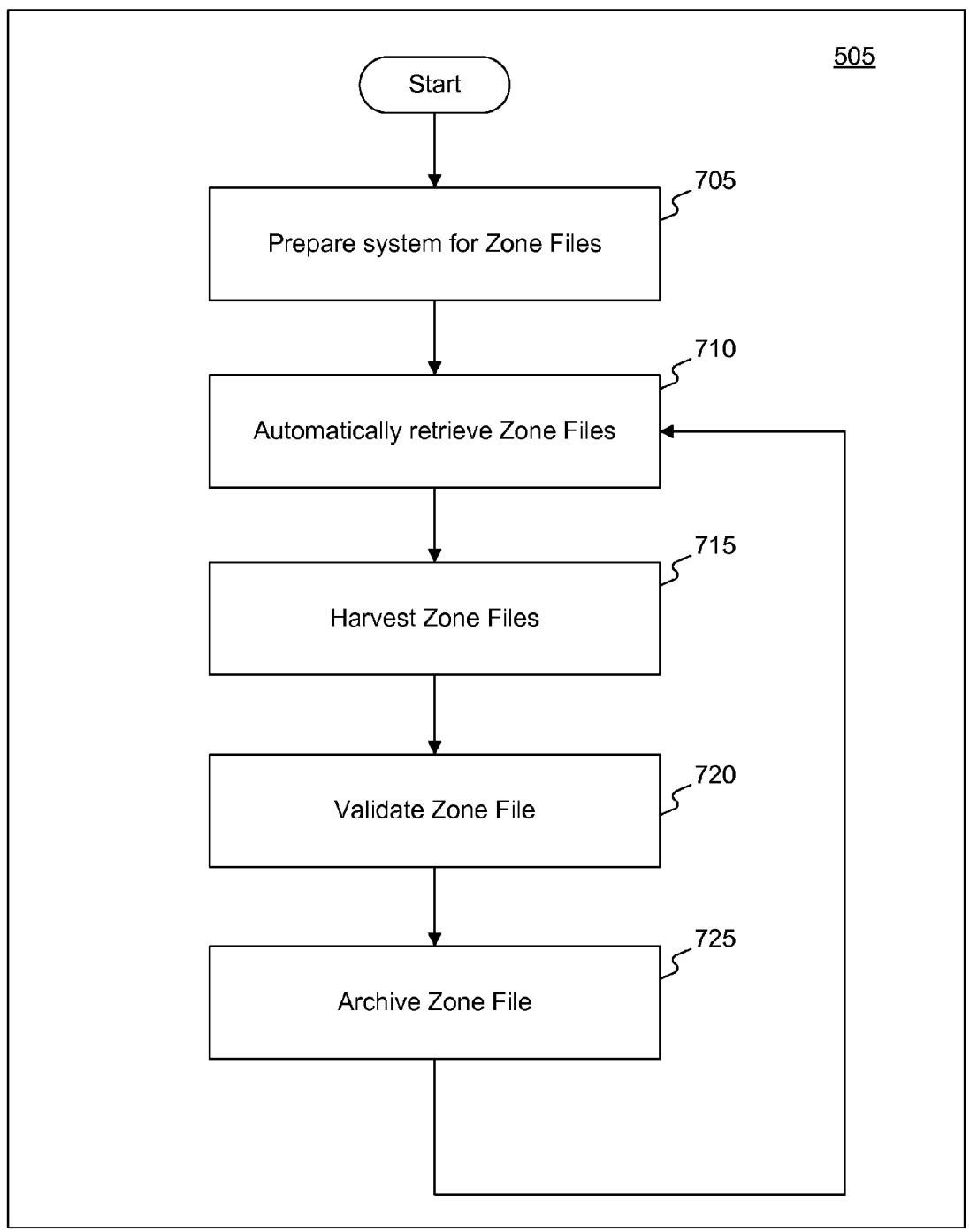
FIG. 7 is a more detailed illustration of the step of "Archive Zone Data" found in FIG. 5.

FIG. 7 further describes the step of Archiving Zone Data 505. In step 705 the system is prepared to receive zone files. This step is further described in FIG. 9. Step 710 automatically retrieves zone files from a target registry using a scheduled process that periodically retrieves zone files all at once, in batches, or individually. Zone files may also be transferred to the registry recovery server from the target registry either periodically or as zone files are updated. Step 715 harvests the zone files by processing each zone file and comparing it to the currently archived version of the zone file. If the zone file has not changed, then no further processing is necessary. If the zone file has changed, the contents of the updated zone file are analyzed for validity in step 720. Step 720 is further described by the process 1000 in FIG. 10.

Step 725 archives the zone file by storing it as a file or as an entry in a database in a file repository system. A certain number of past versions of the archived zone files may be kept for further validation at a later time, may be discarded, or may be purged according to a maintenance schedule. This way the system can keep past versions of the archive zone files as desired, but purge past versions that are very old. The use and application of past archive zone file versions will be further discussed below. The process returns to step 710 to automatically retrieve additional zone files. The process may wait to retrieve the next batch of zone files from the target registry to help distribute the added burden of the target registry processing the zone file request. In the case where the target registry proactively sends changed zone files, the next zone file can be processed immediately on receipt or the process can enter a wait state until a predetermined time has elapsed, a predetermined event occurs, or the system reaches the next scheduled processing time. When all the zone files have been processed, the entire process starts again starting at step 710. Periodically, the steps encompassing step 705 may also be revisited to see if the system needs further preparation, revision, or updating to process the zone files.

Figure 8:
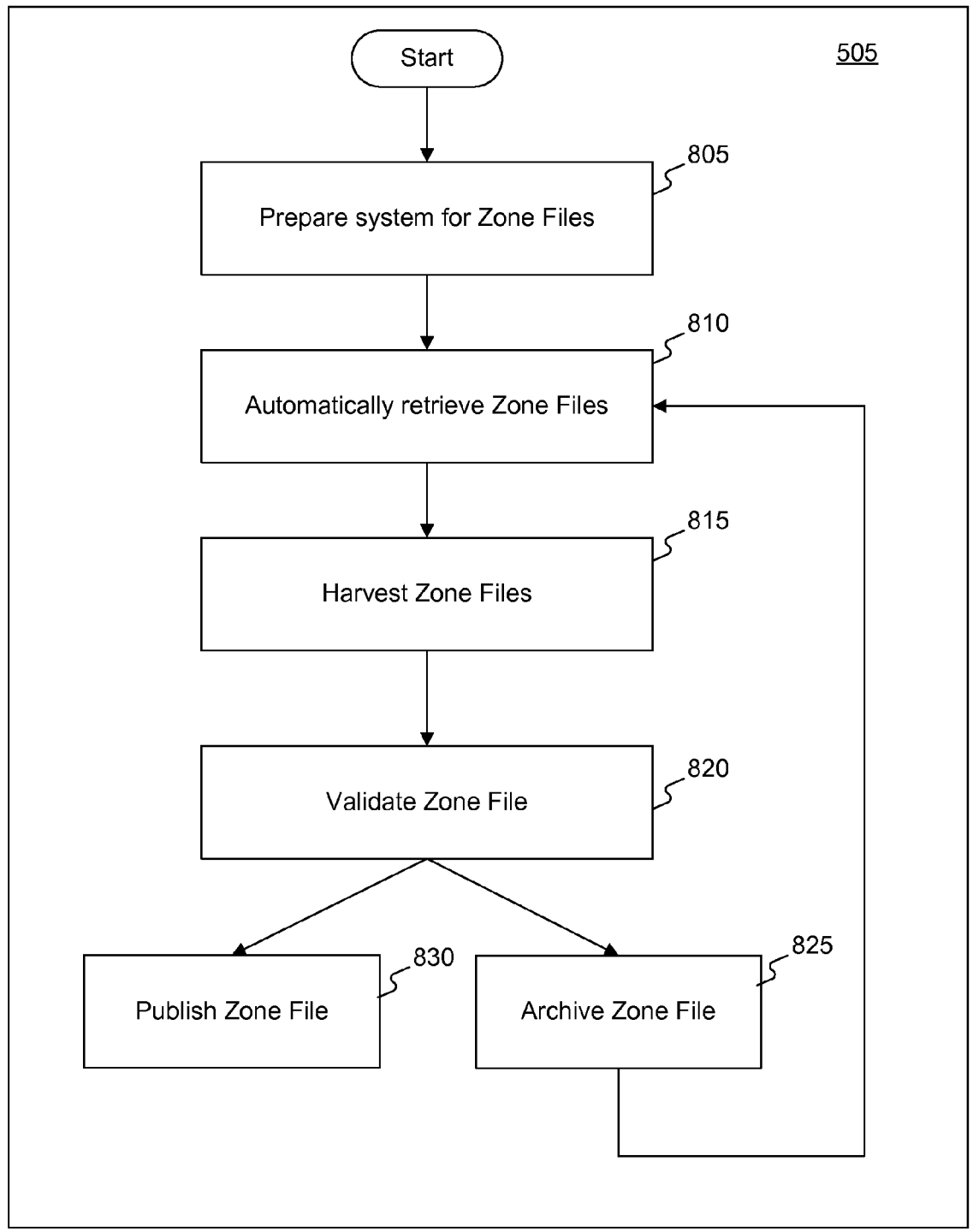
FIG. 8 is an alternative more detailed illustration of the step of "Archive Zone Data" found in FIG. 5.

FIG. 8's process 800 presents an alternative embodiment to the process of 700. The previous discussion above with respect to the steps of process 700 applies equally to the steps of process 800. The difference presented in process 800 is found in step 830. The process 800 may publish the zone file in step 830 and archive the zone file in step 825, or publish and archive the zone file in one step. One purpose of publishing the zone file along with archiving is to reduce the time to process the zone files into a DNS server. The zone files may be published into either a managed DNS server or a non-managed DNS server, and transitioned to a managed DNS server after failure of the target registry occurs. Or, if ownership information is known by the registry recovery system, the zone files may be published directly into a provisioning DNS server. Another purpose of publishing the zone file is to provide a baseline backup registry system that can either load share with the registry or take over name resolution for the registry on request.

Figure 9:
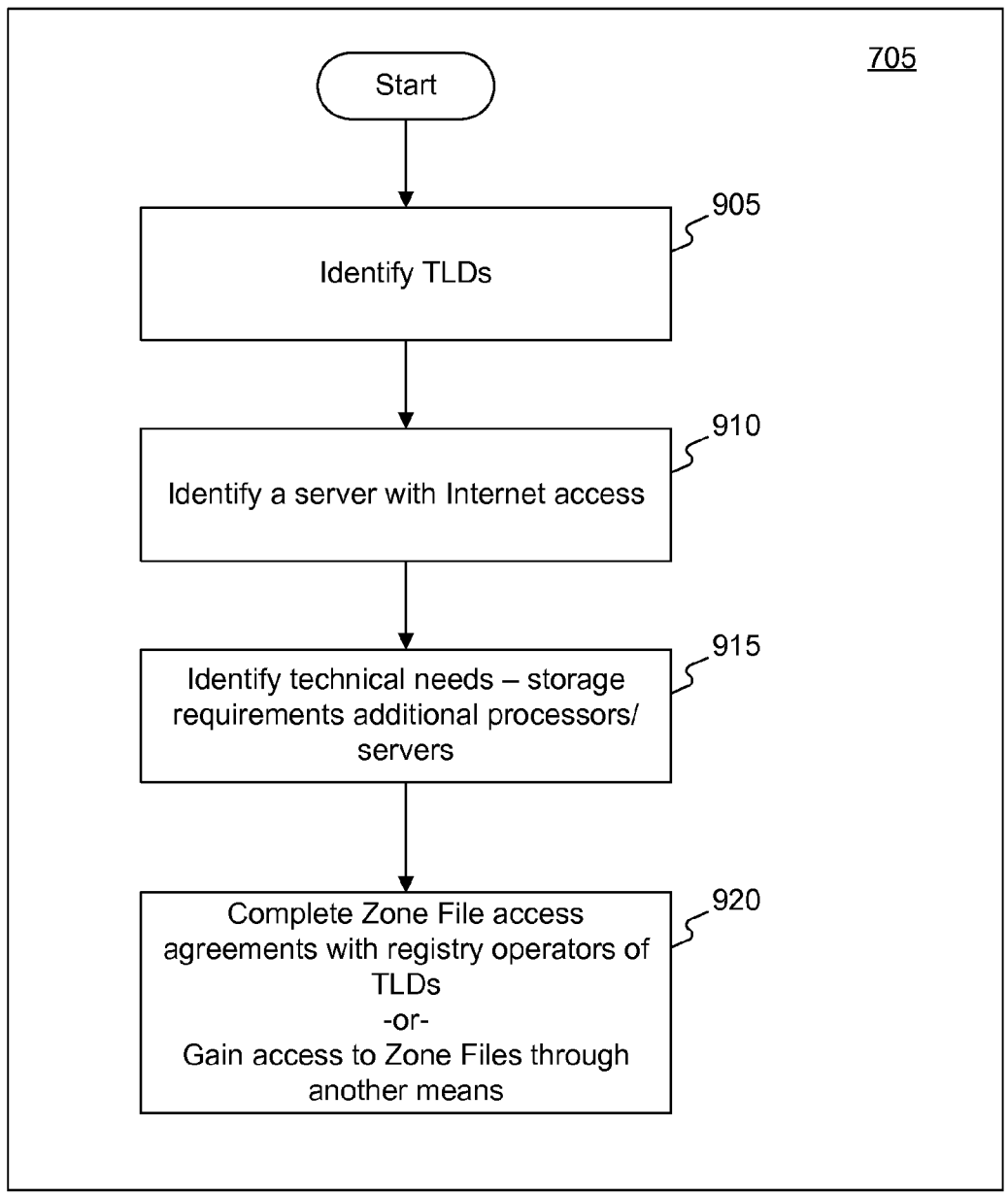
FIG. 9 is a more detailed illustration of the step of "Prepare system for Zone Files" found in FIGS. 7 and 8.

FIG. 9 illustrates the process of step 705 (and 805) in further detail. In one embodiment, step 905 identifies TLDs that may be targeted for recovery. The identification may take place using input from ICANN or from independent studies to analyze and attempt to target registries that have a higher risk of failure. Available data includes the number of registrations gained or lost per quarter per calendar year per registry, geographic data, political data, fiscal data provided by public disclosure by the registry, and any other such metrics. Step 910 identifies a server with Internet access to retrieve the zone files. Technical needs are assessed in step 915. This step may take into consideration the number of zones in the registry. This number varies significantly depending on the TLD. For example, the .COM TLD has about 95 million active registered domain names and nets about 35,000 new registrations daily, whereas the .US TLD has about 1.9 million active registrations and nets about 1,300 new registrations daily. The number of active registrations and average daily registration changes will affect the storage space, processors, and memory required to implement the registry recovery service. Step 915 will also assess the planned usage of the zone archive. For example, if the zone archive is also published as in step 830, then technical needs to publish the zone files will also be assessed. Step 920 completes zone file access agreements with target registries or, in the case of a non-cooperative registry, zone files may be accessed by another means. For example, ICANN may require in future registry agreements mandatory zone file access for certain registry recovery services. In the event the registry operator is cooperative, the registry recovery service may also be able to gain direct access to ownership information.

Figure 10:
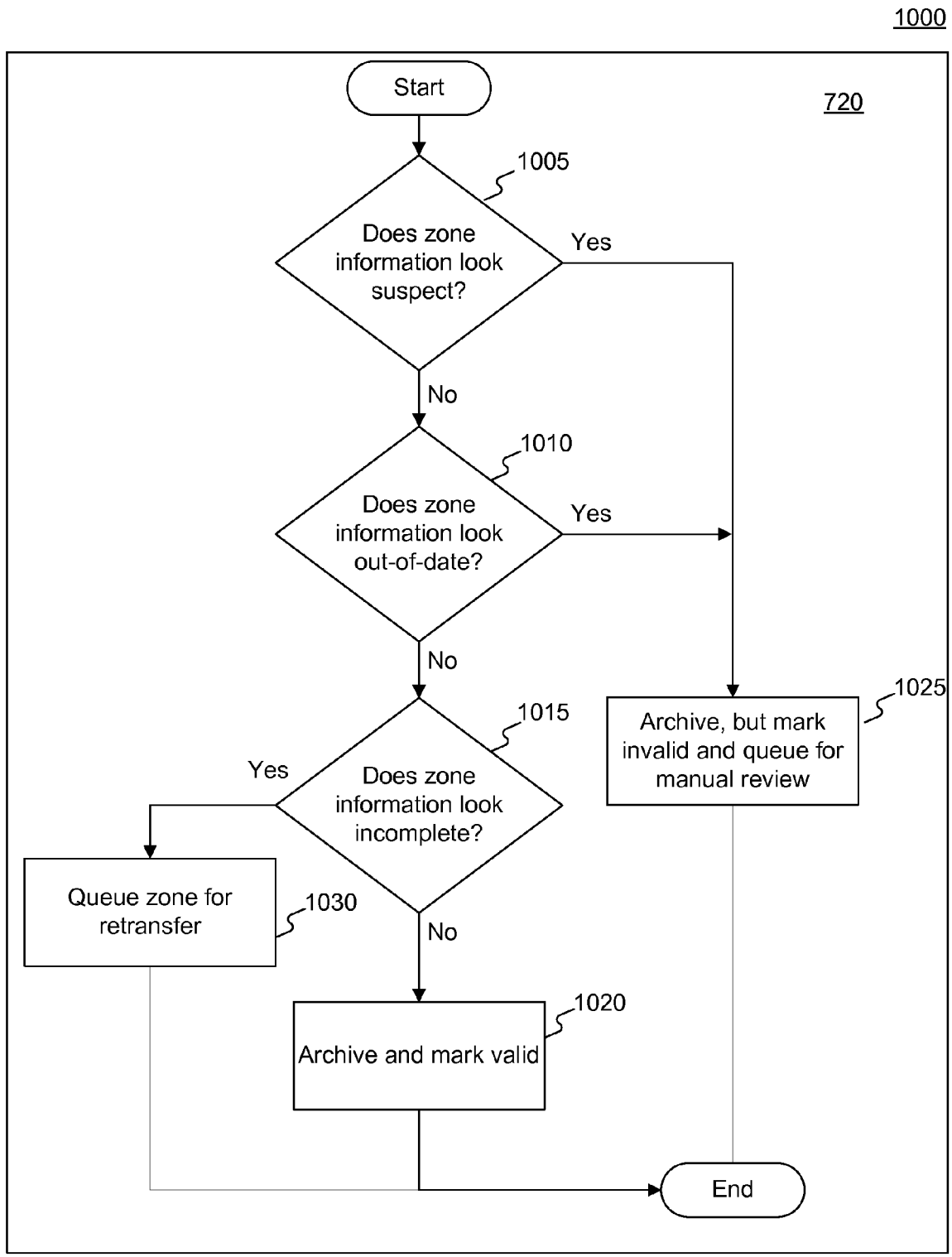
FIG. 10 is a more detailed illustration of the step of "Validate Zone File" found in FIGS. 7 and 8.

In one embodiment, the process 1000 found in FIG. 10 illustrates how the registry recovery servicer validates harvested zone files. In step 1005, the zone file is examined to determine whether any entries on the zone file look suspect. Suspect zone files may be in an invalid format or contain unexpected entries. One concern that the recovery registry may have is that a failed registry or disgruntled employee might sabotage its zone files. The previous archived zone file may be compared to the present zone file, and the differences analyzed. For example, if the entry for the nameserver's IP address has changed from the previous zone file, it may be cross checked in a separate name lookup to verify that the IP for that nameserver did in fact change. Also, for example, if the updated zone file contains comments or extra entries that contain lewd content or references and no other similar words or expressions were in the archive, then it may be determined as suspect. Step 1010 examines the zone file to determine if it is out of date. The current zone file is compared against past archived zone files. If the zone file is identical to an older archived zone file, then it may be out of date. This situation may arise if the target registry restores zone files from outdated backup zone files. The registry recover service may also track the frequency of positive out-of-date indications to determine a trend. For instance, if in a batch of 500 zone files, only 1 triggers a positive for being out-of-date, then the error could probably be ignored and the update allowed to continue, whereas if in a batch of the same size, 100 trigger a positive for being out-of-date, then they probably are actually out-of-date and should be noted and ignored.

If steps 1005 or 1010 result in a positive, then step 1025 archives the zone file, but marks it invalid, indicating that the previous zone file should be used if the registry recovery service publishes the zone files to a DNS server. Step 1015 examines the zone file to determine if the file appears incomplete. This may be done by comparing the previous zone file with the zone file under examination. If the file under examination appears to be missing information then the transfer may have been interrupted for that zone file. In step 1030, the zone is queued for retransfer. The system may also keep the zone file marked incomplete for further analysis. If the zone file passes the validation tests, the registry recovery system archives the zone file.

Figure 11:
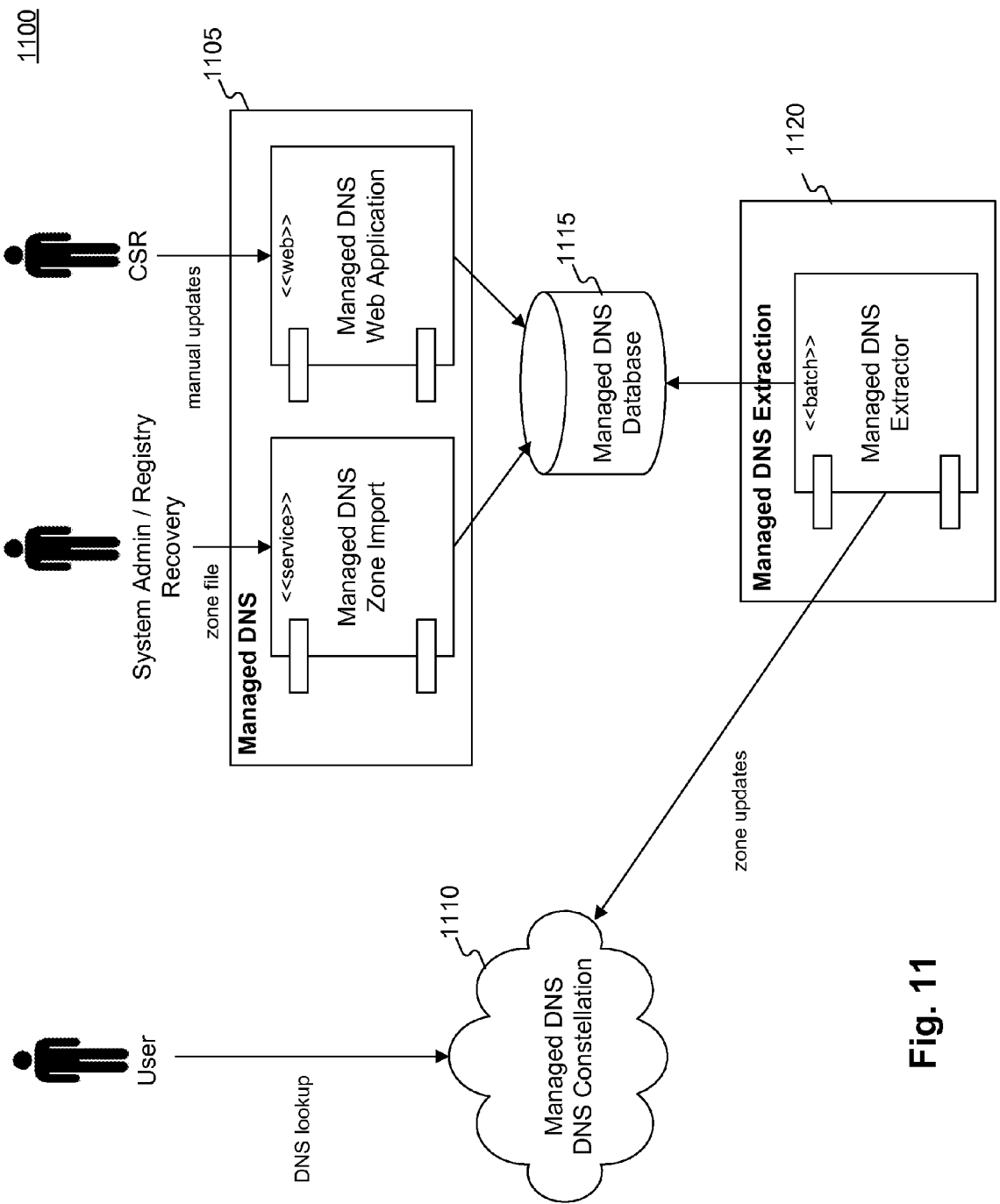
FIG. 11 is an illustration of an exemplary managed DNS system and its various components.

FIG. 11 shows an exemplary managed DNS system 1100. In one embodiment of the registry recovery service, the managed DNS system imports the zone files from the zone archive and publishes the zones to the managed DNS nameserver. Once the zone is published, it is available for DNS lookup by a user. The managed DNS server is configured to accept manual changes by authorized users. These users are typically customer service representatives for the registry recovery service. They may accept a zone file change request, make the change to the zone via a web interface, and propagate the change to the managed DNS nameserver.

Figure 12:
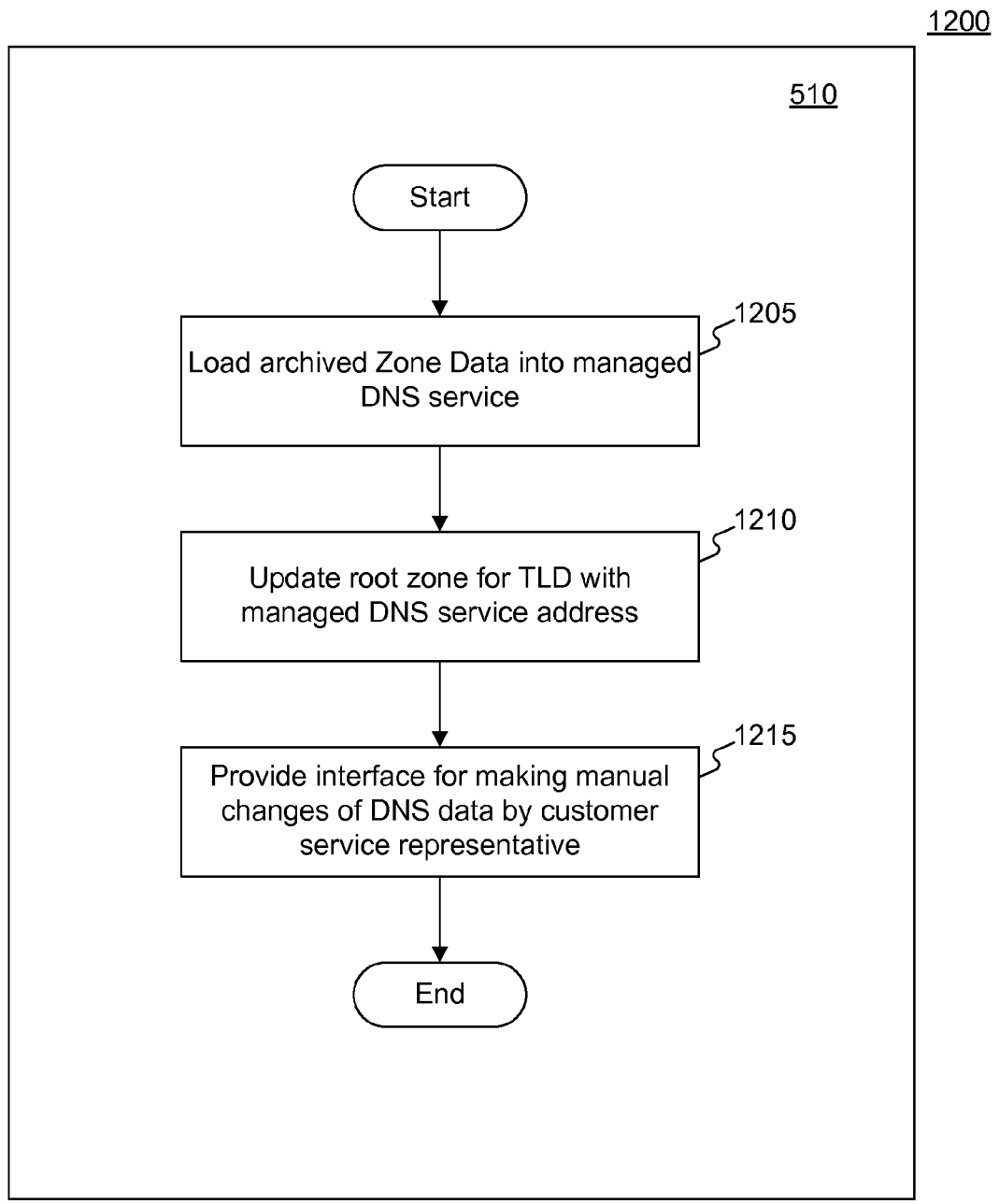
FIG. 12 is a more detailed illustration of the step "Publish Zone Data" found in FIG. 5.

The process of 1200 in FIG. 12 describes how the zone archive is published to a managed DNS server. In one embodiment, step 1205 loads the zone data into the managed DNS service. The data can be either pushed or pulled into the managed DNS service. The managed DNS service then extracts the zone files into a format suitable for the DNS nameserver program that runs on one or more interconnected DNS nameservers. To make the managed DNS nameserver active for the TLD, the root zone managed by the Internet Assigned Numbers Authority (IANA) must be updated with the IP address or addresses of the managed DNS nameserver as in step 1210. In step 1215, the registry recovery service provides an interface to make manual zone changes by authorized customer service representatives. Once made, these changes are propagated to the managed DNS nameserver and made active. One reason that changes must be made manually is because ownership of the zone file is unclear. By requiring a change request to be processed by a customer service representative, the customer service representative may use his or her judgment in determining whether the zone file change should be allowed. Once ownership is determined, a change request can be automated by requiring a proof of identity, such as login credentials.

Figure 13:
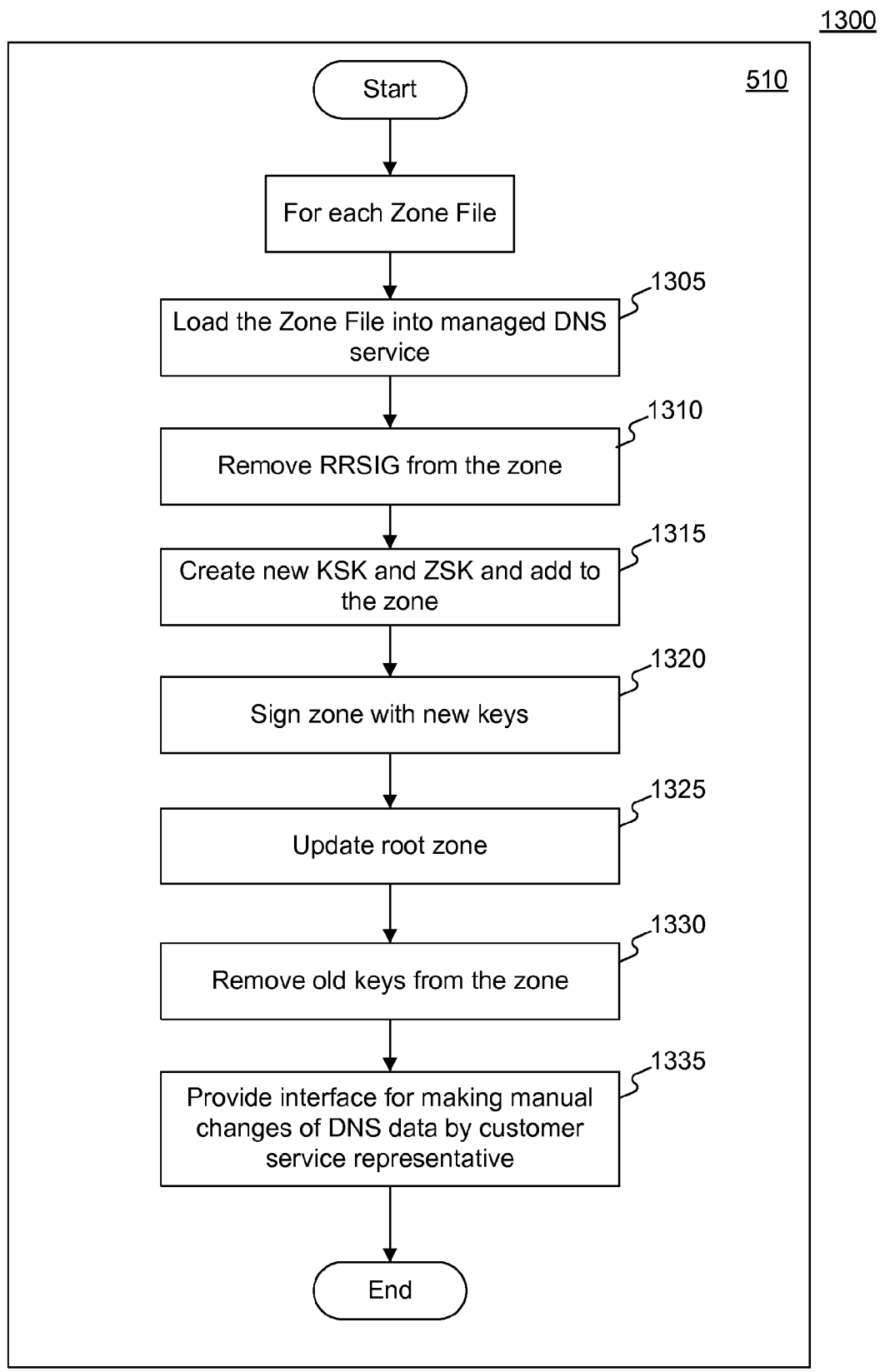
FIG. 13 illustrates an exemplary embodiment of publishing the zone archive to a managed DNS server when DNSSEC is enabled for a particular domain object.

The exemplary process of 1300 in FIG. 13 illustrates how the zone archive is published to a managed DNS server when DNSSEC is enabled for a particular domain object. Step 1305 loads the zone file into the mangaged DNS server for further processing. Step 1310 takes removes the Resource Record Signatures (RRSIG) records from the zone. Step 1315 creates and adds a new keyset (the Key Signing Key (KSK) and Zone Signing Key (ZSK)) to the zone. Step 1320 signs the zone with the new keys. Step 1325 makes a change request to the root zone entry, replacing the nameserver information with the IP address of the managed DNS service, adding a new Delegation Signer (DS) record, and removing the old DS record. Step 1330 removes the old keys from the zone. Step 1335 provides an interface into the managed DNS server to make manual changes to the zone file. This step parallels step 1215, as discussed above.

Figure 14:
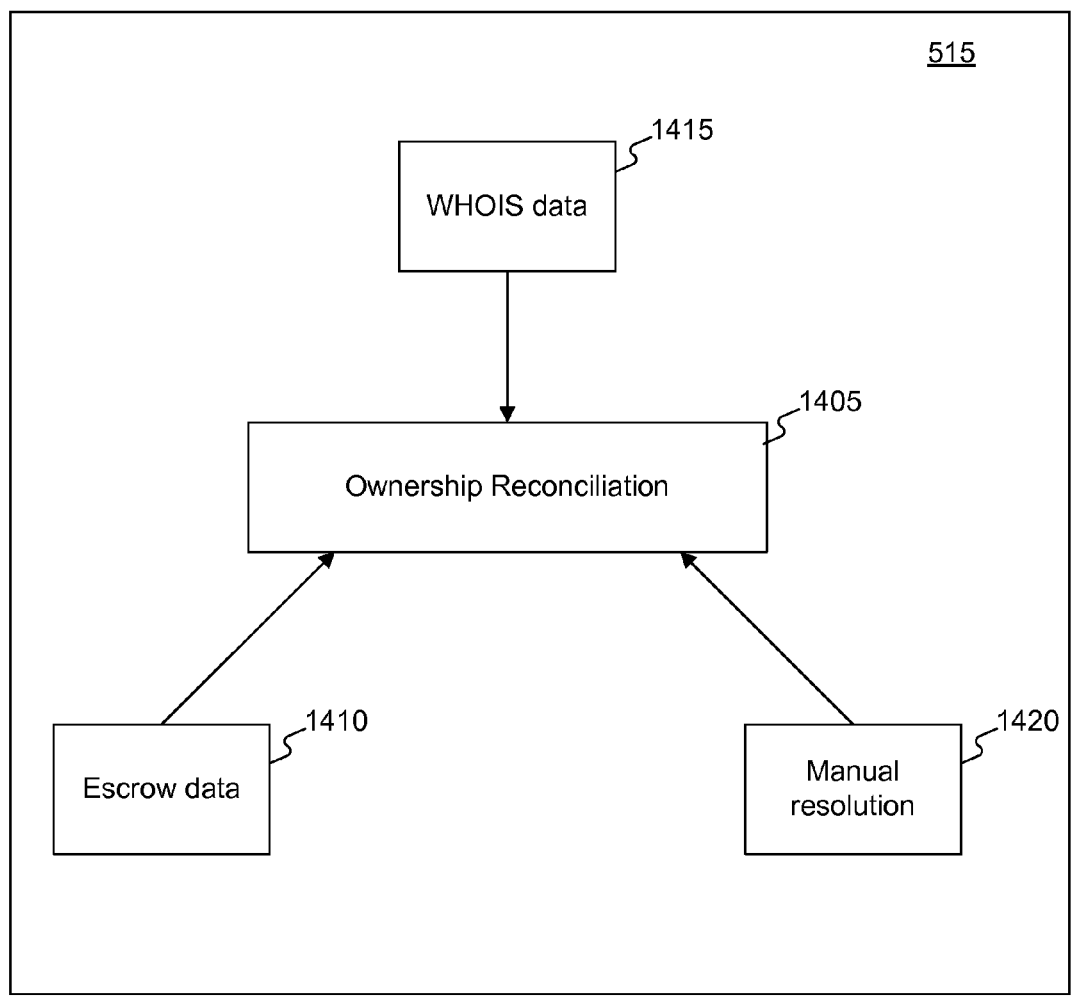
FIG. 14 is a more detailed illustration of the step "Reconcile ownership found in FIG. 5.

When the target registry is uncooperative, ownership of the registry objects in the zone files must be determined in order to transition from the managed DNS nameserver to a full provisioning system, as found in FIG. 14. In addition to allowing automated change requests, the provisioning system allows registrars to add and manage domains through the Extensible Provisioning Protocol system. Ownership reconciliation 1400 resolves which registrar is responsible for the registry object. From the registry's perspective, the registrar is considered the "owner." Some registry systems are so-called "thick" registries, while others are "thin" registries. The registry recovery service may attempt to determine ownership from several different sources. Escrow data 1410 is the most reliable, but may not be available. WHOIS data 1415 may not be available, and its reliability is questionable. Manual resolution 1420 may require the most effort, but most of the process of manual resolution may be automated and the result will be reliable. Also, it may be possible for the registry to access ownership information directly either by including access to ownership information with zone file archiving or through a separate mode of access similar to zone file archiving. Direct access to ownership information would be the most reliable, even if associating ownership information and zone files requires a custom tool. Ownership reconciliation 1405 may use one or all of these methods and may cycle through them as often as necessary to achieve ownership reconciliation. Each of these methods is addressed in turn.

In general, the full escrow deposits of ownership data across all TLDs are provided weekly with incremental escrow deposits provided daily. If possible, the registry recovery service would obtain escrow data for pre-population of the provisioning database and merge in the zone archive data. Access to escrow data might be limited or delayed by bankruptcy courts or at the direction of creditors. Even when escrow data is available, merging the data with the zone files into the provisioning database requires significant manual effort. Custom programming likely would be implemented to use the escrow data, in part, because each registrar may format its data differently. A standardized format for escrow data in the future would reduce the time necessary to merge the escrow data with the zone archives because some of the programming could be done in advance.

Figure 15:
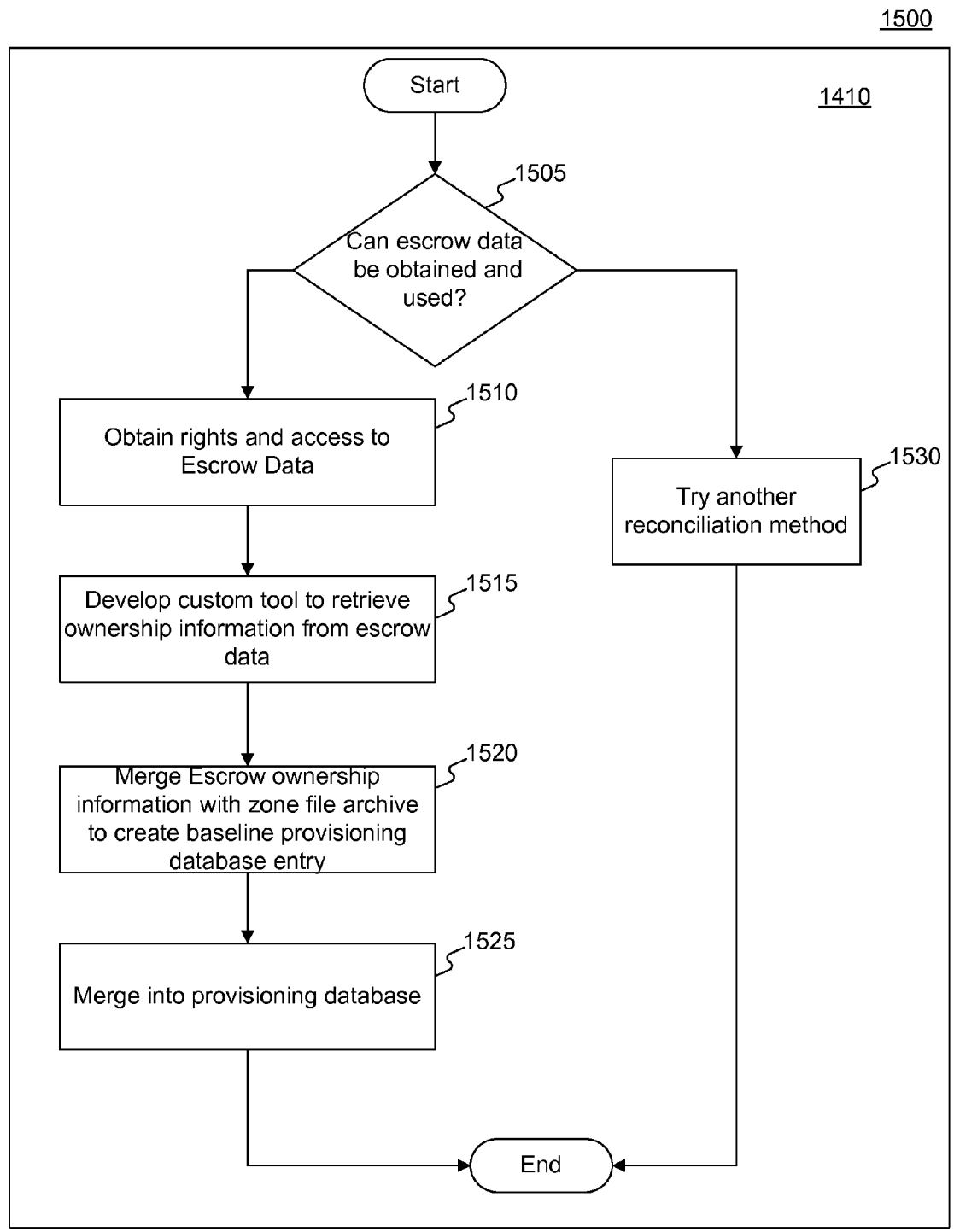
FIG. 15 is a more detailed illustration of the step "Escrow data" in the "Ownership Reconciliation" process found in FIG. 14.
Figure 16:
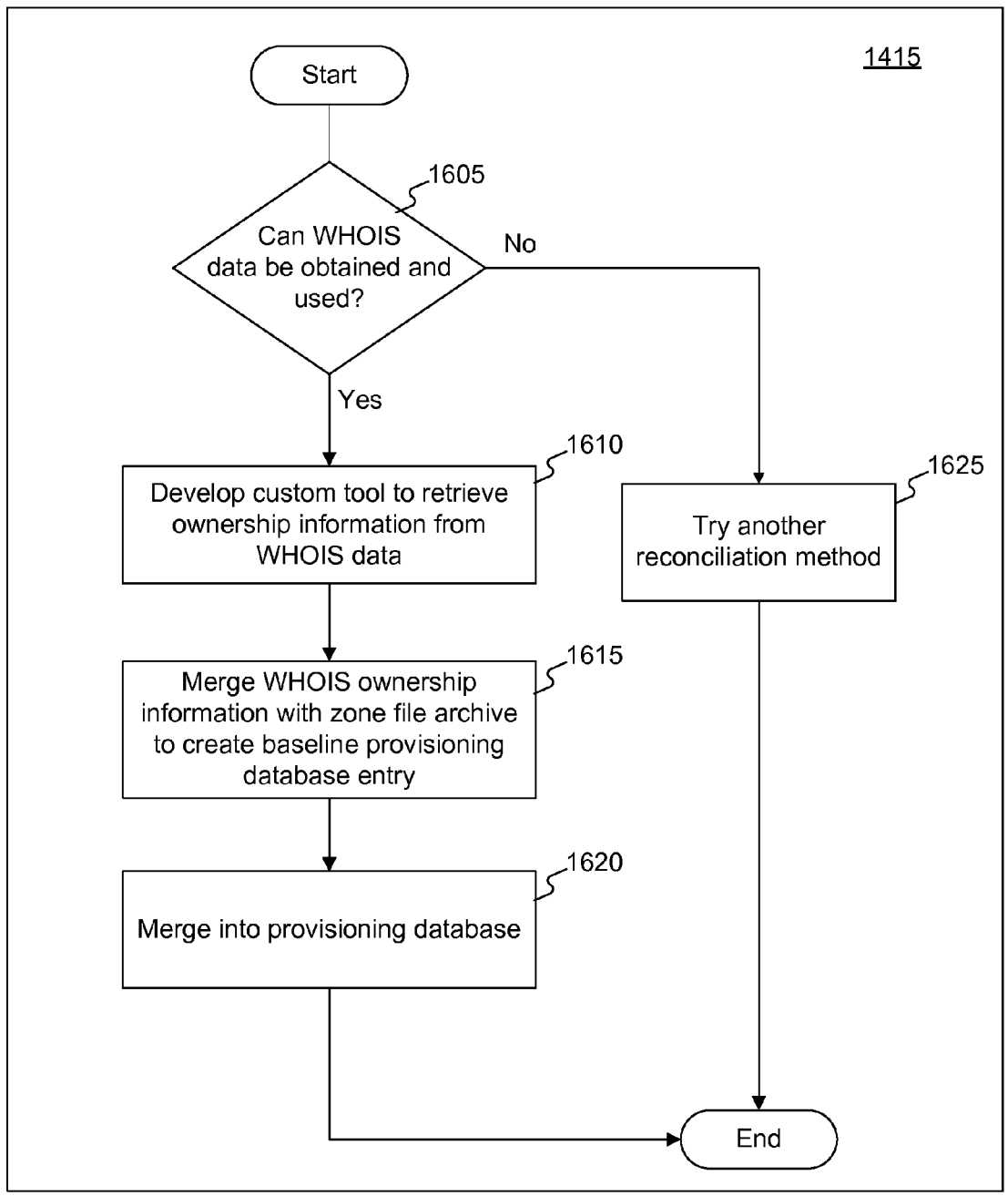
FIG. 16 is a more detailed illustration of the step "WHOIS data" in the "Ownership Reconciliation" process found in FIG. 14.

In the process of 1500 found in FIG. 15, the registry recovery service determines whether escrow data can be obtained and used in step 1505, and if so rights to use escrow data are obtained in step 1510. If not, then another reconciliation method is attempted in step 1530. The escrow data is retrieved and the format analyzed to create a custom tool in step 1515 to retrieve ownership information from the escrow data. Ideally, the escrow data format will be the same for every owner record in the registry, but this may not be so. It may be that the data format has evolved over time so that registrars' information is stored differently. Step 1520 merges the escrow ownership information with the zone file archive to create a baseline provisioning database entry, which is then merged into the provisioning database in step 1525. Even if another reconciliation method is attempted as a result of step 1530, the registry recovery service may revisit step 1505 at any time in the ownership reconciliation process to see if escrow data has become available.

The process 1600 for using WHOIS data to determine ownership is similar to using escrow data. The step 1605 determines whether WHOIS data can be obtained and used. Step 1605 would likely determine that WHOIS data cannot be used. Access requirements for WHOIS data vary between TLDs. In most cases, the access and use of WHOIS data can be used only for a free, public WHOIS service. If in the future WHOIS data can be access by a registry recovery service or if the target TLD does not specify such restrictions, WHOIS data can be used to determine ownership. Step 1610 uses a custom tool to retrieve ownership information from the WHOIS data because there is no standard format for WHOIS data. The ownership information is merged with the zone file archive in step 1615 and then merged into the provisioning database in step 1620. In the likely event WHOIS data may not be used, then another ownership reconciliation method will be pursued in step 1625, referring back to step 1415 or 1420.

Figure 17:
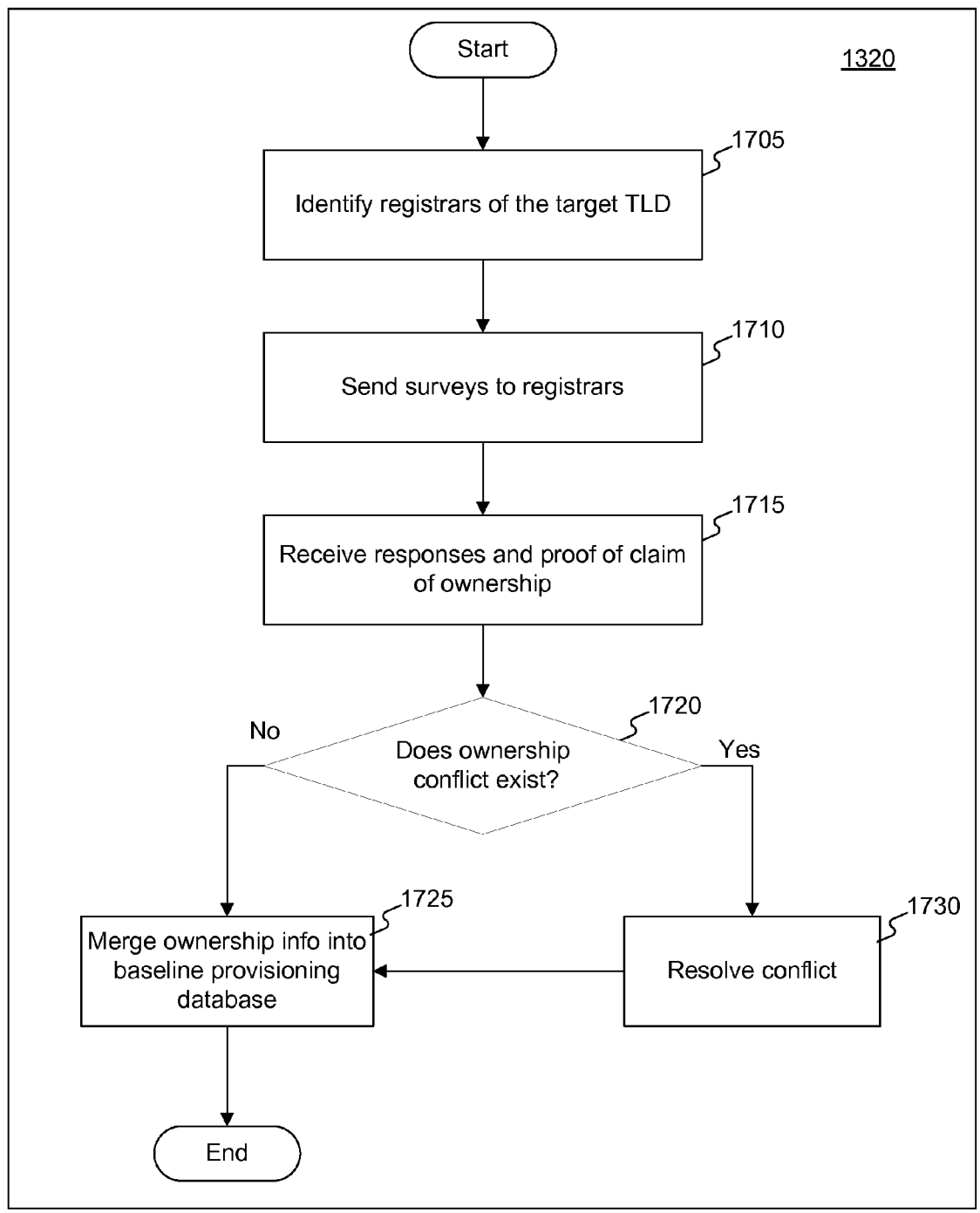
FIG. 17 is a more detailed illustration of the step "Manual resolution" in the "Ownership Reconciliation" process found in FIG. 14.

In one embodiment, the process 1700 found in FIG. 17 illustrates the method used to manually reconcile ownership information. Although this requires the most effort, the result will be a reliable reconciliation of ownership. Step 1705 identifies the registrars associated with the target TLD. The registry recovery service sends surveys in step 1710 to the registrars. The registrars respond in step 1715 with their understanding of ownership of the domains it claims to own on behalf of its registrants. The registrars may also provide proof of ownership, such as report information for the target registry. Using the information from the surveys and any available proof, the registry recovery service determines whether an ownership conflict exists for each zone file (step 1720). If no conflict exists the ownership information may be merged with the zone file and into the baseline provisioning database (step 1725). If a conflict does exist then the conflict is resolved (step 1730) using a predetermined set of criteria that takes into account the proof of ownership. Once resolved the ownership data is merged with the zone archive files and into the provisioning database (step 1725).

Figure 18:
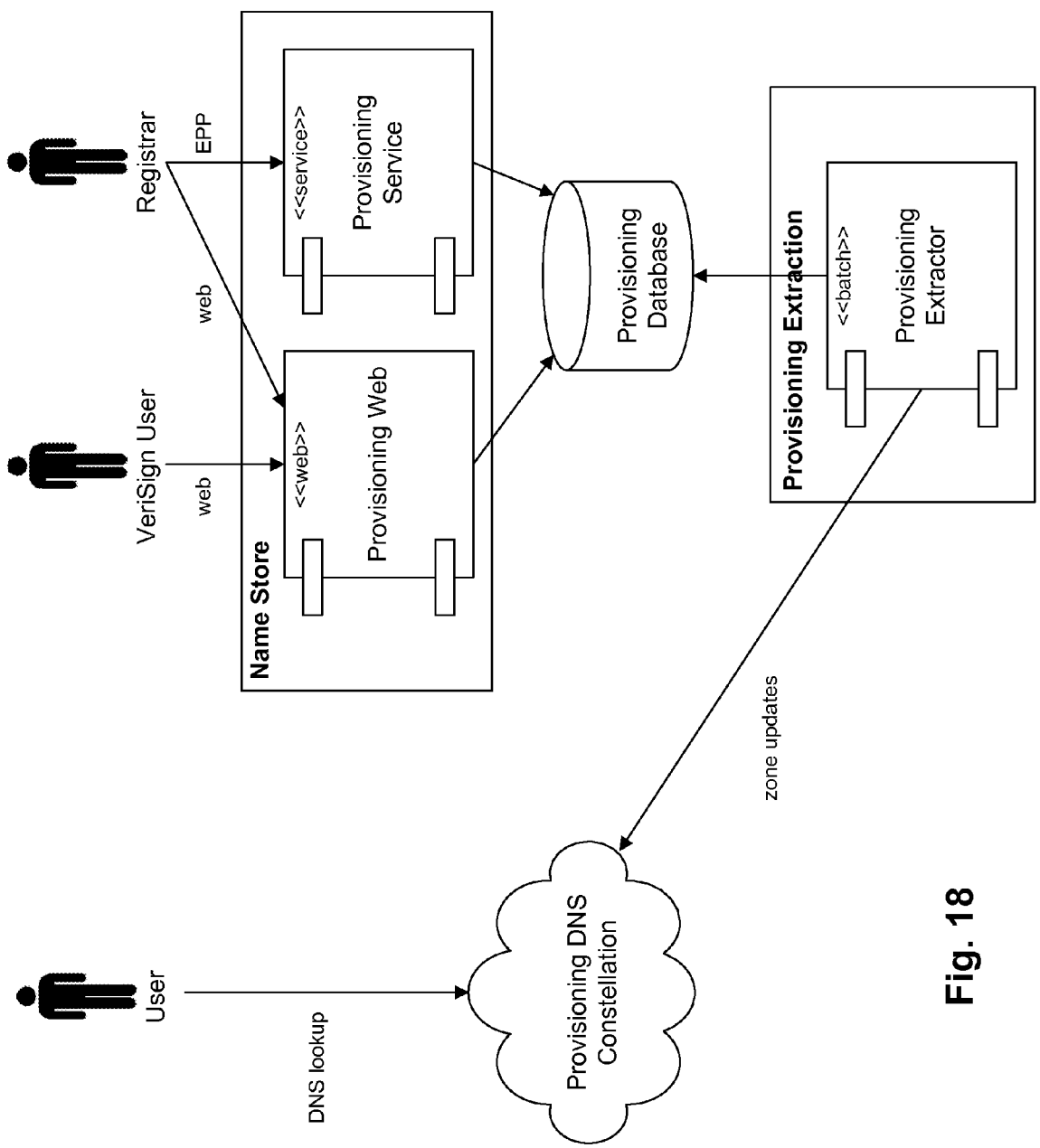
FIG. 18 is an illustration of an exemplary provisioning DNS system and its various components.

FIG. 18 illustrates an exemplary provisioning DNS system. The provisioning DNS system is similar to the managed DNS system of FIG. 11. The provisioning DNS system allows registrars to interface and manage their domains through the EPP and web interfaces.

Figure 19:
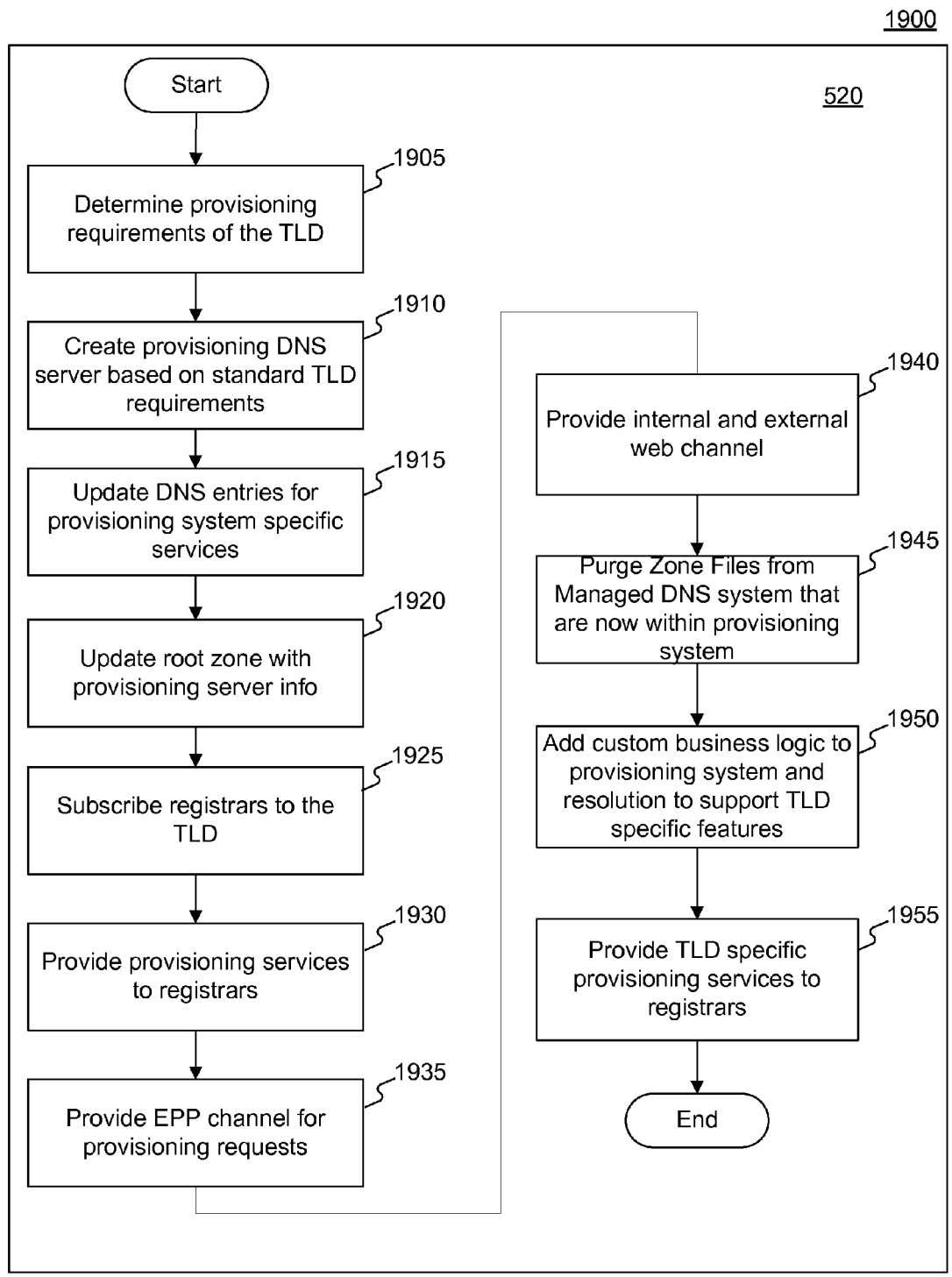
FIG. 19 is a more detailed illustration of the step "Launch provisioning system" found in FIG. 5.

In one embodiment, as when the target registry is uncooperative and DNSSEC is not used, the process 1900 of publishing the owner reconciled zone files is illustrated in FIG. 19. The registry recovery system may determine which provisioning requirements are required by the TLD (step 1905). This is discussed in further detail below. The provisioning DNS server is created based on the TLD requirements to be implemented (step 1910). This step also includes the extraction of the merged zone files and ownership information into the provisioning system. In step 1915, DNS entries for provisioning system specific services, such as whois.tld, epp.tld, and ns.tld, are updated. To direct DNS traffic to the system, IANA's root servers must be updated to include the IP address of the provisioning server (step 1920). Using the ownership information, registrars are subscribed to the TLD (step 1925). In step 1930, provisioning services are provided to the registrars. Once provisioning services are operating for the TLD, any zone files that have been loaded into the provisioning server are fully manageable by the owner registrars. Steps 1935 and 1940 provide interfaces for the registrars to make changes. Moreover, new registrations can be processed for the TLD of the interfaces.

A provisioned zone file may be removed from the managed DNS server as illustrated in step 1945. For some TLDs, custom business logic is added to the provisioning system to support specific features of the TLD (step 1945). For example, the .NAME TLD contains a special feature that forwards an emails such as john.smith.name to a corresponding email address like jsmith@yahoo.com. To implement these special features the operators of the registry recovery service must program them into the provisioning system, add support for them in the provisioning database, and provide the required resolution services and support tools. In step 1955, these TLD specific provisioning services are provided to the registrars through EPP or other means.

In one embodiment, as when the target registry is cooperative and DNSSEC is not used, the process 1900 may be modified accordingly. For example, because of the cooperative relationship between the registry and the recovery registry service, the provisioning system and TLD specific features may already be created in advanced. Moreover, because ownership reconciliation was not needed, zone files may be published directly into the provisioning system, without the need to use a transitional managed DNS solution. Thus, triggering the registry recovery service may simply require loading the latest zone files from the zone file archive into the provisioning server (or if already loaded, verifying the loaded version as the latest version), updating DNS entries for provisioning specific services (step 1915), and updating the root zone with the provisioning server's DNS service information (step 1920). Steps 1925, 1930, 1935, 1940, and 1955 may be accomplished as described above.

Figure 20:
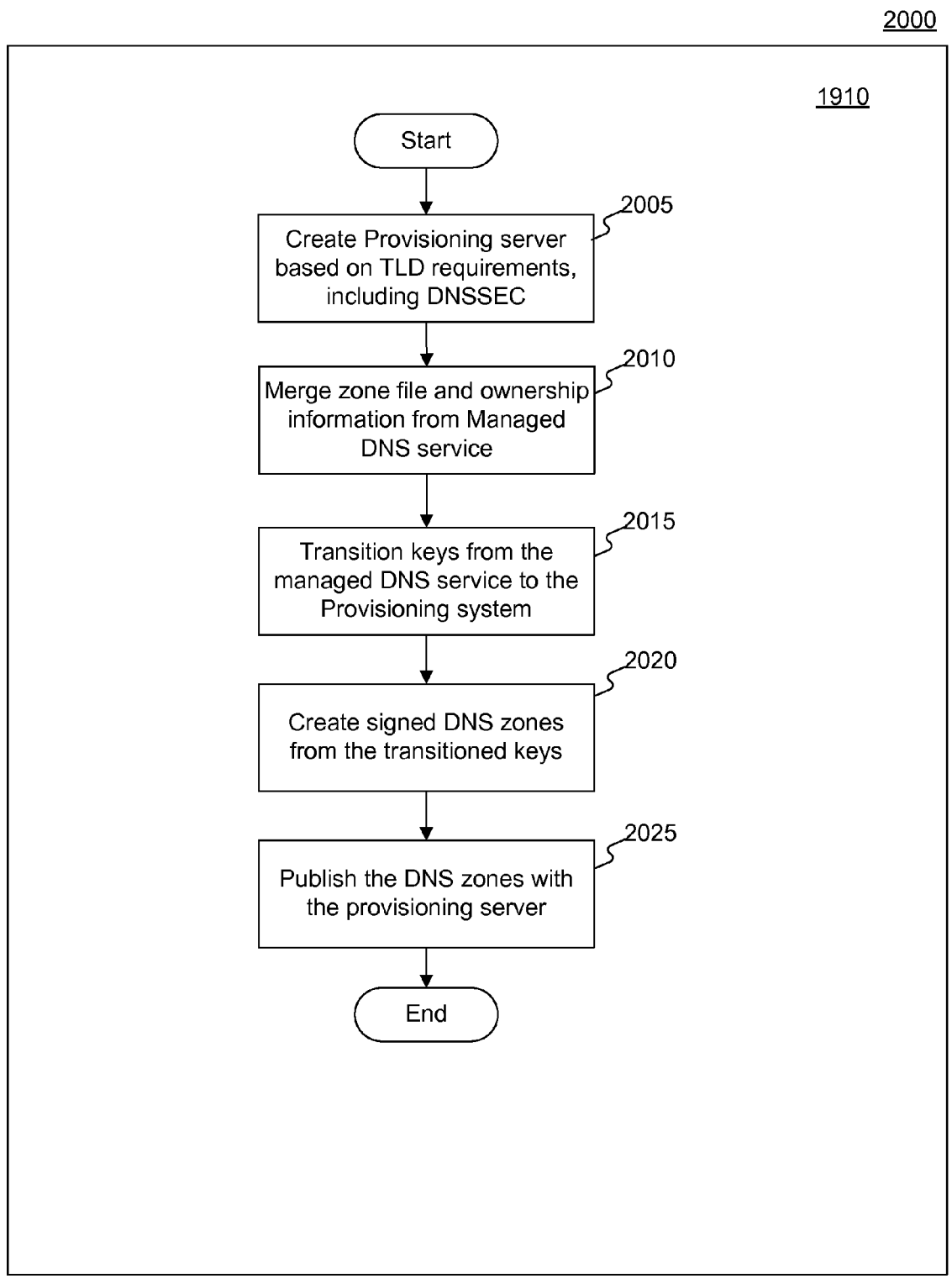
FIG. 20 illustrates an exemplary embodiment of the step "Create provisioning DNS server based on standard TLD requirements" found in FIG. 19.

In one embodiment, as when the target registry is uncooperative and DNSSEC is used, the process 2000 of creating a provisioning DNS server based on TLD requirements, including DNSSEC is illustrated in FIG. 20. In step 2005, the provisioning DNS server is created based on the TLD requirements to be implemented, including DNSSEC. Step 2010 extracts the merged zone files and ownership information from the managed DNS service into the provisioning system. Step 2015 transitions keys from the managed DNS service to the provisioning system. Step 2020 creates signed DNS zones in the provisioning system using the transitioned keys. In step 2025, the provisioning system publishes the DNS zones in a DNS server. The rest of the process of implementing the provisioning server may then be executed according to process 1900.

Figure 21:
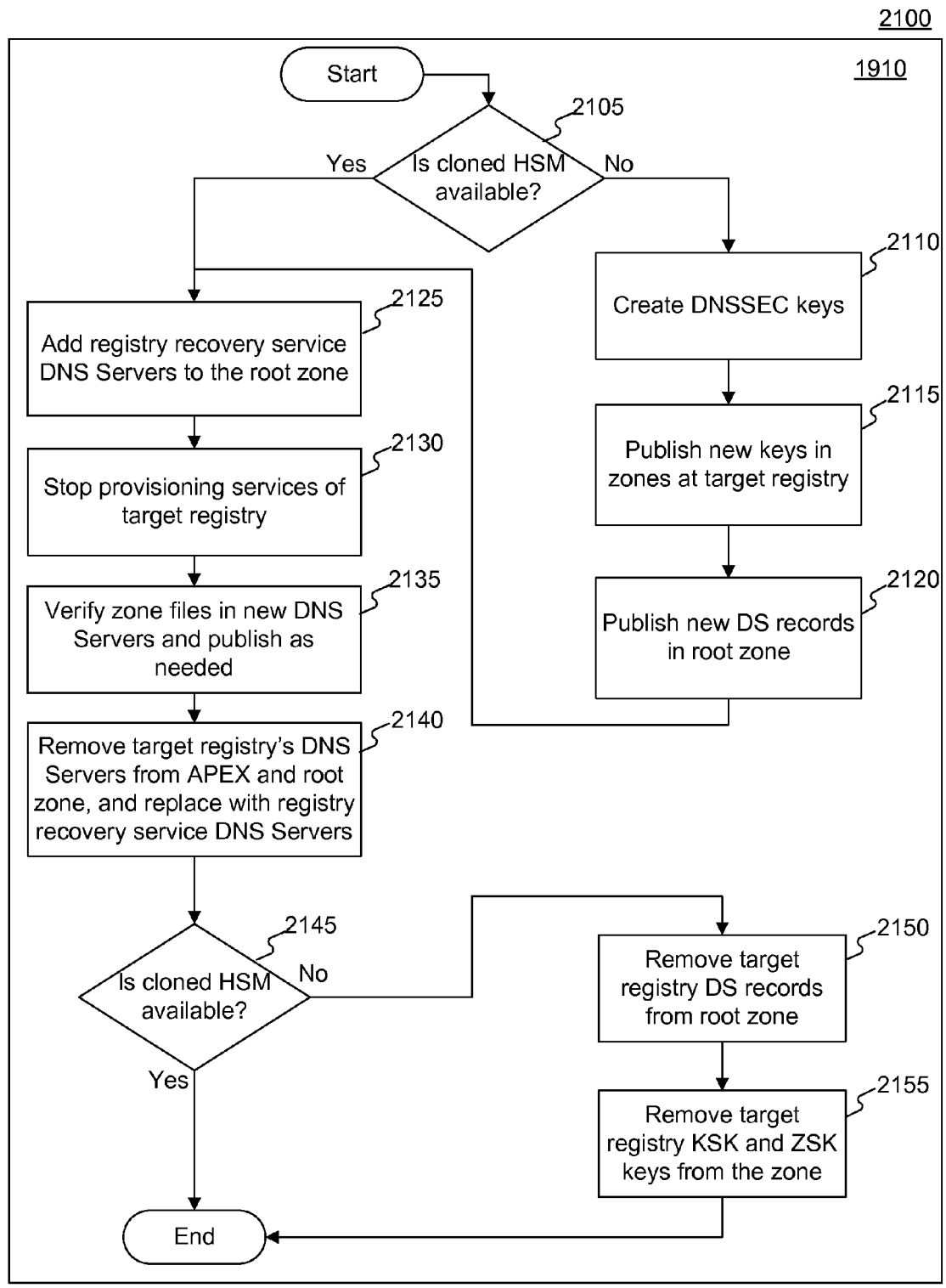
FIG. 21 illustrates another exemplary embodiment of the step "Create provisioning DNS server based on standard TLD requirements" found in FIG. 19.

In one embodiment, as when the target registry is cooperative and DNSSEC is used, the process 1900 may be modified accordingly. For example, because of the cooperative relationship between the registry and the recovery registry service, the provisioning system and TLD specific features may already be created in advanced. Moreover, because ownership reconciliation was not needed, zone files may be published directly into the provisioning system, without the need to use a transitional managed DNS solution. Thus, triggering the registry recovery service may simply require dealing with DNSSEC issues as in exemplary process 2100, loading the latest zone files from the zone file archive into the provisioning server (or if already loaded, verifying the loaded version as the latest version) and updating DNS entries for provisioning specific services (step 1915). Steps 1925, 1930, 1935, 1940, and 1955 may be accomplished as described above. The exemplary process 2100 of creating a provisioning DNS server based on TLD requirements (step 1910), including DNSSEC is illustrated in FIG. 21. In step 2105, the process determines whether a cloned Hardware Signing Module (HSM) is available. If available, the registry recovery service can mimic the DNSSEC keys of the target registry, simplifying the transitioning of services. If not available, the process may create new DNSSEC keys (step 2110), and publish the new keys in the zones at the target registry (step 2115). Publishing the new keys in the DNS at the target registry will allow for a uninterrupted takeover of DNS services, because there will be no chain of trust issues. Likewise, step 2120 publishes the new DS records for the recovery registry service DNS in the root zone. Step 2125 adds the registry recovery service DNS servers to the root zone, thereby beginning to load share DNS queries of the TLD zone. Once provisioning services are stopped in the target registry (step 2130), zone files become static and may no longer change via EPP or some other update mechanism. In step 2135, zone files are verified in the registry recovery service DNS servers by comparing them to the now static zone of the target registry, and published as needed. In step 2140, the target registry's DNS servers are removed from the zone apex and replaced with the registry recovery service's DNS servers. The target registry's DNS servers are also removed from the root zone, thereby transitioning all DNS services to the registry recovery service DNS servers. The zone apex contains the list of name servers of the TLD and should match what is set in the parent zone (root zone). The zone apex should be considered more authoritative than the parent zone (root zone). Once the target DNS servers are no longer used, the zone apex should remove them and then the parent zone (root zone) should remove the name servers from the TLD. Step 2140 may be carried out incrementally, to ease the burden of transition. If a cloned HSM is used (as considered in step 2145), the target registry's DS records are requested to be removed from the root zone (step 2150), and the target registry's Key Signing Key (KSK) and Zone Signing Key (ZSK) are removed from the DNS zone. The rest of the process of implementing the provisioning server may then be executed according to process 1900, as modified above.

Figure 22:
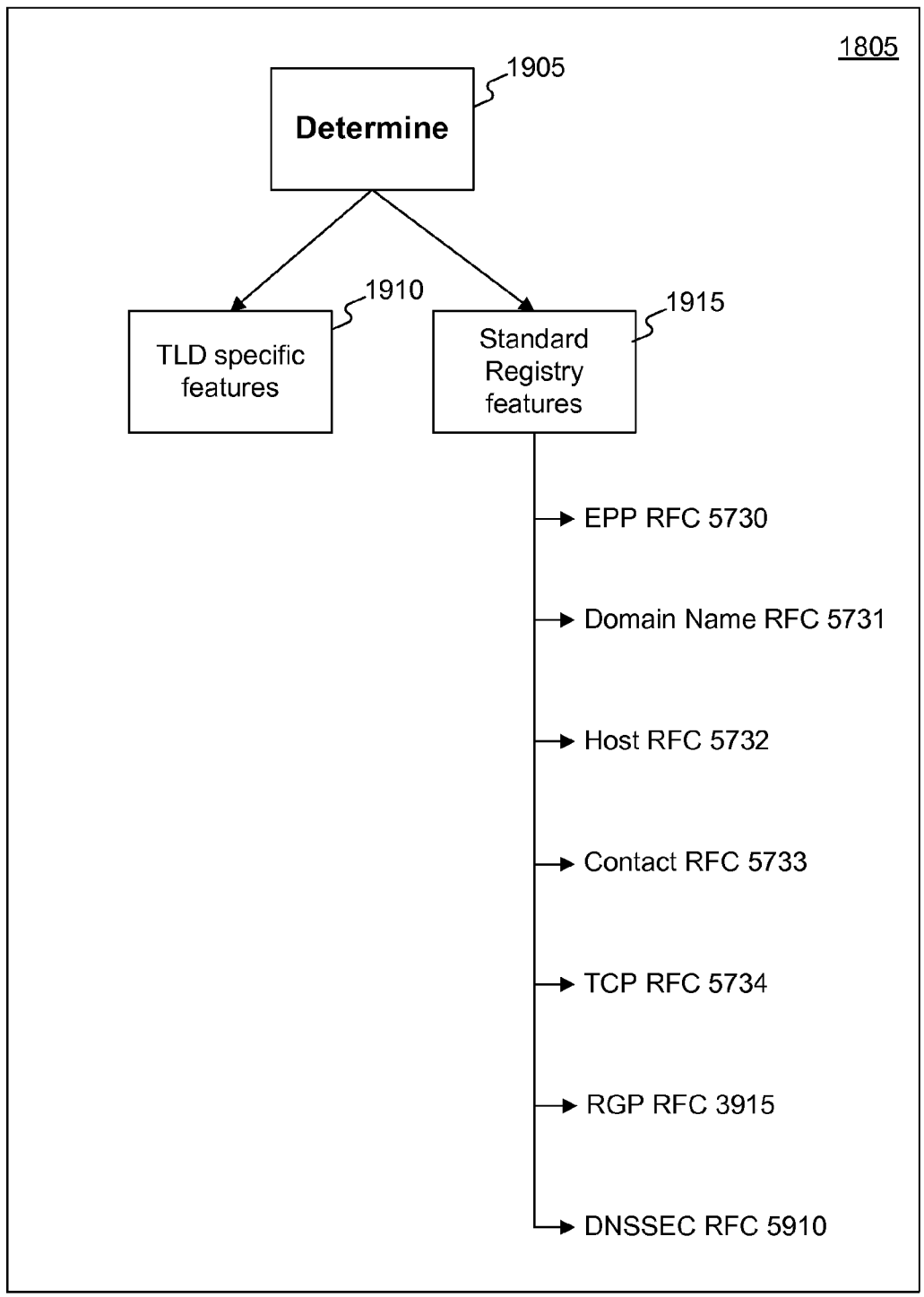
FIG. 22 is a more detailed illustration of the step "Determine provisioning requirements of the TLD" found in FIG. 19.

FIG. 22 illustrates an exemplary process 2200 of determining which registry features are to be supported in the recovered registry. These features can either be standards based 2215 or specific to the TLD 2210. Certain of the standards would likely be present in every recovered registry. For example, even if the registry did not implement RFC 5730 for Extensible Provisioning Protocol (EPP), the registry recovery service would likely transition registrars to that interface because it is a standard and because the registry recovery service can access known reliable implementations of the EPP. Other services that would likely be implemented by every registry are RFC 5731 for Domain Name, RFC 5732 for Host, RFC 5734 for Transmission Control Protocol (TCP), and RFC 3915 for Redemption Grace Period (RGP). For similar reasons as with EPP, all of these services would also likely be implemented by the registry recovery service. Once the registry has been recovered the registry recovery service may service the TLD indefinitely or transition the TLD to another registry. Implementing the TLD registry services according to the standards makes for easier transition if that is the route or provides a "best practices" approach to implementing the registry.

Some of the standards based registry services are optional. For instance, RFC 5733 for Contact only needs to be implemented if the registry is a "thick" registry, that is, one that stores information regarding the individual registrants. If the recovered TLD was a "thin" registry then there is no need to implement RFC 5733. Another optional standards based service is for RFC 5910 for DNSSEC as has been discussed above. RFC 5910 provides for an EPP extension mapping for the provisioning and management of DNSSEC extensions for domain names stored in a shared central repository. These features are required for the provisioning of DNS security extensions.

Other embodiments of the invention will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A computer-implemented method of recovering a registry comprising:
   receiving zone data for a zone from the registry;
   archiving the zone data into a data repository;
   publishing the zone data into a managed DNS service;
   reconciling ownership of the zone data;
   launching a provisioning DNS service for the zone; and
   enabling DNS Security (DNSSEC) extensions on the zone by digitally signing the zone with a Zone Signing Key (ZSK).

2. The method of claim 1, comprising:
   implementing a WHOIS service; and
   implementing services specific to the registry.

3. The method of claim 1, wherein the managed DNS service is configured to electronically accept zone updates from an authorized user via an electronic interface, wherein the authorized user is not a zone owner.

4. The method of claim 1, wherein the reconciling ownership of the zone data is based on at least one of escrow data, WHOIS data, and survey data.

5. The method of claim 1, wherein the provisioning DNS service is configured to electronically accept zone updates from a zone owner via an electronic interface.

6. The method of claim 1, wherein the ownership of the zone
   data is reconciled by:
   receiving from registrars claimed ownership information;
   resolving conflicts of ownership based on a predetermined conflict resolution process; and
   assigning ownership based on at least one of the predetermined conflict resolution process and claims of ownership.

7. The method of claim 1, comprising:
   updating a root zone server with a corresponding Delegator Signor (DS) key.

8. A system of recovering a registry comprising:
   a non-transitory memory storing instructions; and
   a processor executing the instructions to cause the system to perform a method comprising:
   receiving zone data for a zone;
   archiving the zone data into a data repository;
   publishing the zone data into a managed DNS service;
   reconciling ownership of the zone data;
   launching a provisioning DNS service for the zone; and
   enabling DNS Security (DNSSEC) extensions on the zone by digitally signing the zone with a Zone Signing Key (ZSK).

9. The system of claim 8, comprising:
   implementing a WHOIS service; and
   implementing services specific to the registry.

10. The system of claim 8, wherein the managed DNS service is configured to electronically accept zone updates from an authorized user via an electronic interface, wherein the authorized user is not a zone owner.

11. The system of claim 8, wherein the reconciling ownership of the zone data is based on at least one of escrow data, WHOIS data, and survey data.

12. The system of claim 8, wherein the provisioning DNS service is configured to electronically accept zone updates from a zone owner via an electronic interface.

13. The system of claim 8, wherein the ownership of the zone data is reconciled by:
receiving from registrars claimed ownership information;
resolving conflicts of ownership based on a predetermined conflict resolution process; and
assigning ownership based on at least one of the predetermined conflict resolution process and claims of ownership.

14. The system of claim 8, comprising:
updating a root zone server with a corresponding Delegator Signor (DS) key.

15. A non-transitory computer-readable storage medium containing instructions which, when executed on a processor, perform a method comprising:
receiving zone data for a zone from the registry;
archiving the zone data into a data repository;
publishing the zone data into a managed DNS service;
reconciling ownership of the zone data;
launching a provisioning DNS service for the zone: and
enabling DNS Security (DNSSEC) extensions on the zone by digitally signing the zone with a Zone Signing Key (ZSK).

16. The computer-readable medium of claim 15, wherein the method
comprises:
implementing a WHOIS service; and
implementing services specific to the registry.

17. The computer-readable medium of claim 15, wherein the managed DNS service is configured to electronically accept zone updates from an authorized user via an electronic interface, wherein the authorized user is not a zone owner.

18. The computer-readable medium of claim 15, wherein the reconciling ownership of the zone data is based on at least one of escrow data, WHOIS data, and survey data.

19. The computer-readable medium of claim 15, wherein the provisioning DNS service is configured to electronically accept zone updates from a zone owner via an electronic interface.

20. The computer-readable medium of claim 15, wherein the
ownership of the zone data is reconciled by:
receiving from registrars claimed ownership information;
resolving conflicts of ownership based on a predetermined conflict resolution process; and
assigning ownership based on at least one of the predetermined conflict resolution process and claims of ownership.

21. The computer-readable medium of claim 15, wherein the method comprises:
updating a root zone server with a corresponding Delegator Signor (DS) key.

22. A computer-implemented method of recovering a registry comprising:
receiving zone data and ownership information from the registry;
archiving the zone data and ownership information;
publishing the zone data into a provisioning DNS service; and
enabling DNSSEC extensions on a zone by digitally signing the zone with a ZSK and updating a root zone server with a corresponding DS key.

23. The method of claim 22, comprising:
updating root zone servers with an ip address corresponding to the provisioned DNS service.

24. A non-transitory computer-readable storage medium containing instructions which, when executed on a processor, perform a method comprising:
receiving zone data and ownership information from the registry;
archiving the zone data and ownership information;
publishing the zone data into a provisioning DNS service;
enabling DNSSEC extensions on a zone by digitally signing the zone with a ZSK and updating a root zone server with a corresponding DS key.

25. The computer-readable medium of claim 24, wherein the method comprises:
updating root zone servers with an ip address corresponding to the provisioned DNS service.

26. A system of recovering a registry comprising:
a non-transitory memory storing instructions; and
a processor executing the instructions to cause the system to perform a method comprising:
receiving zone data and ownership information from the registry;
archiving the zone data and ownership information;
publishing the zone data into a provisioning DNS service; and
enabling DNSSEC extensions on a zone by digitally signing the zone with a ZSK and updating a root zone server with a corresponding DS key.

27. The system of claim 26, wherein the method comprises:
updating root zone servers with an ip address corresponding to the provisioned DNS service.

* * * * *